United States Patent
Kim et al.

(10) Patent No.: US 10,775,788 B2
(45) Date of Patent: Sep. 15, 2020

(54) AUTONOMOUS VEHICLE AND CONTROL METHOD THEREOF

(71) Applicant: LG ELECTRONICS INC., Seoul (KR)

(72) Inventors: Sangwon Kim, Seoul (KR); Kyunglack Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 393 days.

(21) Appl. No.: 15/808,732

(22) Filed: Nov. 9, 2017

(65) Prior Publication Data

US 2018/0136655 A1 May 17, 2018

(30) Foreign Application Priority Data

Nov. 11, 2016 (KR) .................. 10-2016-0150442

(51) Int. Cl.
 G05D 1/00 (2006.01)
 B60R 22/48 (2006.01)
 (Continued)

(52) U.S. Cl.
 CPC ........... G05D 1/0088 (2013.01); B60N 2/002 (2013.01); B60R 22/48 (2013.01); B60R 25/23 (2013.01);
 (Continued)

(58) Field of Classification Search
 CPC .. G05D 1/0088; G05D 1/0246; G05D 1/0011; G05D 2201/0212; B60R 22/48;
 (Continued)

(56) References Cited

U.S. PATENT DOCUMENTS 7,909,246 B2 * 3/2011 Hogg .................... G06Q 20/04
                                                      235/375
9,720,410 B2 * 8/2017 Fairfield .............. G05D 1/0044
(Continued)

FOREIGN PATENT DOCUMENTS

JP   2015-200933 A   11/2015
KR   10-1306238 B1   9/2013
(Continued)

*Primary Examiner* — Tuan C To

(74) *Attorney, Agent, or Firm* — Birch, Stewart, Kolasch & Birch, LLP

(57) ABSTRACT

An autonomous driving vehicle including a wireless communication unit configured to receive a location of an external terminal having requested the autonomous driving vehicle; and a processor configured to perform autonomous driving of the autonomous driving vehicle to a first destination corresponding to the location of the external terminal; detect a person at the first destination getting into the autonomous driving vehicle; in response to the detected person getting into the autonomous driving vehicle satisfying an autonomous driving condition, perform the autonomous driving to a second destination requested by the external terminal; and in response to the detected person getting into the autonomous driving vehicle not satisfying the autonomous driving condition, maintain a stopped state of the autonomous driving vehicle at the first destination.

30 Claims, 21 Drawing Sheets

(51) Int. Cl.

| | |
|---|---|
| *B60N 2/00* | (2006.01) |
| *B60R 25/25* | (2013.01) |
| *B60R 25/24* | (2013.01) |
| *B60R 25/23* | (2013.01) |
| *G05D 1/02* | (2020.01) |
| *H04W 4/024* | (2018.01) |
| *H04W 4/40* | (2018.01) |
| *H04W 4/44* | (2018.01) |
| *H04L 29/08* | (2006.01) |
| *G06Q 10/02* | (2012.01) |
| *G06Q 30/02* | (2012.01) |
| *G06Q 50/30* | (2012.01) |

(52) U.S. Cl.
CPC .............. *B60R 25/24* (2013.01); *B60R 25/25* (2013.01); *G05D 1/0011* (2013.01); *G05D 1/0246* (2013.01); *H04L 67/12* (2013.01); *H04W 4/024* (2018.02); *H04W 4/40* (2018.02); *H04W 4/44* (2018.02); *G05D 2201/0212* (2013.01); *G06Q 10/02* (2013.01); *G06Q 30/0284* (2013.01); *G06Q 50/30* (2013.01)

(58) Field of Classification Search
CPC ......... B60R 25/23; B60R 25/24; B60R 25/25; H04W 4/024; H04W 4/44; H04W 4/40; B60N 2/002; H04L 67/12; G06Q 10/02; G06Q 30/0284; G06Q 50/30
USPC ........................................................... 701/23
See application file for complete search history.

(56) References Cited

U.S. PATENT DOCUMENTS

| | | | | |
|---|---|---|---|---|
| 9,971,348 | B1* | 5/2018 | Canavor | H04W 12/0609 |
| 2013/0238170 | A1* | 9/2013 | Klinger | G05D 1/104 |
| | | | | 701/3 |
| 2013/0297099 | A1* | 11/2013 | Rovik | B60R 16/037 |
| | | | | 701/2 |
| 2014/0244678 | A1* | 8/2014 | Zamer | G06F 16/9535 |
| | | | | 707/758 |
| 2015/0339928 | A1* | 11/2015 | Ramanujam | G08G 1/202 |
| | | | | 701/23 |
| 2015/0348112 | A1* | 12/2015 | Ramanujam | G06Q 30/0266 |
| | | | | 705/14.63 |
| 2016/0085565 | A1* | 3/2016 | Arcese | H04L 63/0861 |
| | | | | 726/7 |
| 2016/0173568 | A1* | 6/2016 | Penilla | H04L 67/10 |
| | | | | 709/217 |
| 2017/0068245 | A1* | 3/2017 | Scofield | G01C 21/3617 |
| 2017/0313323 | A1* | 11/2017 | Tseng | B60W 10/00 |
| 2018/0107942 | A1* | 4/2018 | Jiang | G08G 1/096725 |
| 2019/0258263 | A1* | 8/2019 | Wendel | B60W 60/00253 |

FOREIGN PATENT DOCUMENTS

| | | |
|---|---|---|
| KR | 10-2014-0074617 A | 6/2014 |
| KR | 10-2015-0132045 A | 11/2015 |
| KR | 10-2016-0003880 A | 1/2016 |
| KR | 10-2016-0066776 A | 6/2016 |
| WO | WO 2015/166811 A1 | 11/2015 |

* cited by examiner

AUTONOMOUS VEHICLE AND CONTROL METHOD THEREOF

CROSS-REFERENCE TO RELATED APPLICATION

Pursuant to 35 U.S.C. § 119(a), this application claims the benefit of an earlier filing date and right of priority to Korean Patent Application No. 10-2016-0150442, filed on Nov. 11, 2016, the contents of which is incorporated by reference herein in its entirety.

BACKGROUND

1. Field of the Invention

The present disclosure relates to an autonomous driving vehicle, a control method, and an autonomous driving system including the same.

2. Background of the Invention

A vehicle is a mechanism of transporting people or loads using kinetic energy. Typical examples of a vehicle include an automobile and a motor cycle. For purposes of safety and convenience of users of vehicles, various sensors and devices are typically provided in vehicles that facilitate a variety of functions. Such functions often include a convenience function for promoting drivers' convenience, and a safety function for promoting safety of drivers and/or pedestrians.

Convenience functions have been developed for vehicles to improve drivers' convenience, examples of which include an infotainment (information+entertainment) function, supporting an autonomous driving function, or assisting a driver to secure a visual field at night or in a blind spot. For example, convenience functions typically include active cruise control (ACC), a smart parking assist system (SPAS), a night vision (NV), a head-up display (HUD), an around view monitor (AVM), an adaptive headlight system (AHS), and the like.

Safety functions have been developed to improve safety of drivers and/or pedestrians, examples of which include a lane departure warning system (LDWS), a lane keeping assist system (LKAS), an autonomous emergency braking (AEB) function, and the like. As an example, such functions may be implemented in autonomous driving vehicles that autonomously operate to reach a destination without a driver's intervention.

Autonomous driving of a vehicle typically involves autonomously operating at least one of acceleration, deceleration, or a driving direction. In some scenarios, autonomous driving is controlled by a preset algorithm, even without a driving operation device being operated by a driver.

Autonomous driving vehicles provide improved convenience for users, for example by allowing drivers to utilize time that would be otherwise required for driving to other activities, such as reading books, viewing videos, or sleeping. Autonomous driving can involve various algorithms, examples of which include an algorithm for determining a possibility of a collision with an object outside a vehicle and avoiding a collision, or an algorithm for adjusting a speed of the vehicle, while adjusting a distance to other vehicles ahead or behind the vehicle.

SUMMARY

Implementations are described herein that enable systems and techniques for an autonomous driving vehicle that adaptively performs autonomous driving to one or more destinations based on dynamically verifying whether one or more passengers satisfy autonomous driving conditions.

In one aspect, an autonomous driving vehicle is configured to perform autonomous driving and includes: a wireless communication unit configured to receive a location of a terminal; and at least one processor. The at least one processor is configured to: perform autonomous driving to a first destination corresponding to the location of the terminal; detect at least one person at the first destination; determine, based on the detected at least one person at the first destination, whether at least one autonomous driving condition is satisfied; based on a determination that the at least one autonomous driving condition is satisfied, perform an autonomous driving operation to a second destination; and based on a determination that the at least one autonomous driving condition is not satisfied, maintain a stopped state of the autonomous driving vehicle at the first destination.

Further scope of applicability of the present disclosure will become more apparent from the detailed description given hereinafter. However, it should be understood that the detailed description and specific examples, while indicating certain implementations of the disclosure, are given by way of illustration only, and that various changes and modifications within the scope of the disclosure may be made.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION

Figure 1:
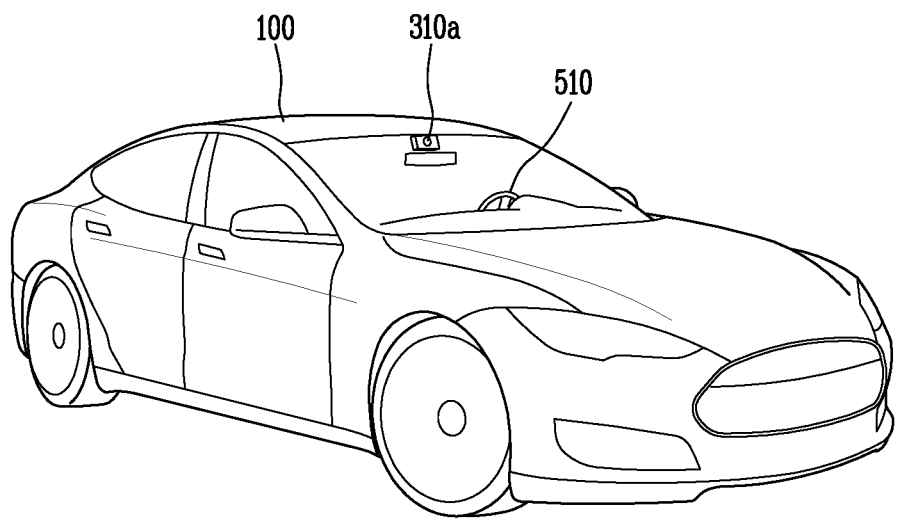
FIG. 1 is a diagram illustrating an example of a vehicle according to an implementation of the present disclosure.
Figure 1:
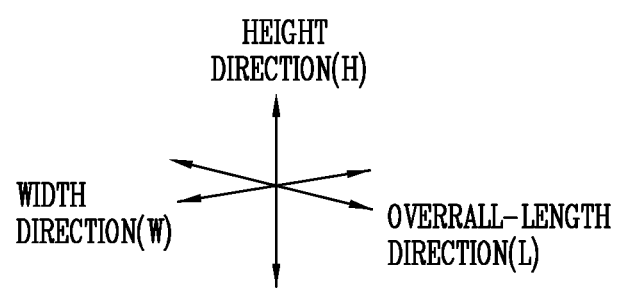

Implementations disclosed herein enable systems and techniques for an autonomous driving vehicle that adaptively performs autonomous driving to a plurality of destinations based on dynamically verifying whether one or more passengers satisfy autonomous driving conditions. As such, implementations disclosed herein provide an autonomous driving vehicle that takes into consideration characteristics or actions of passengers to determine autonomous driving operations to various destinations.

For example, if the autonomous driving vehicle provides a taxi service or car-sharing service, then implementations disclosed herein enable the autonomous driving vehicle to effectively handle various issues regarding verifying passengers who are allowed to get in, when the autonomous driving vehicle is to start driving, how to handle a passenger when the vehicle has a problem, determining appropriate fare calculations, transporting additional passengers to the same destination, and other issues that may arise in such scenarios.

The autonomous driving vehicle is configured to perform a transfer operation, so that a passenger can efficiently be transported to a destination using the transfer operation. Such scenarios may arise, for example, when the autonomous driving vehicle has a fault or problem during autonomous driving and cannot transport the passenger to the desired destination. The autonomous driving vehicle is also configured to assist a passenger to get out when the vehicle arrives at a destination.

Further, the autonomous driving vehicle is configured to inform a passenger when an article that belongs to the passenger is lost or damaged within the vehicle. The autonomous driving vehicle is also configured to only begin autonomous driving when certain autonomous driving conditions are fulfilled by a passenger. This improves safety of the passenger.

In addition, the autonomous vehicle verifies that only an authenticated person is allowed to get into the autonomous driving vehicle, thus mitigating problems in which an unauthorized third party gets in the autonomous driving vehicle. A vehicle according to an embodiment of the present disclosure includes any suitable vehicle, such as a car, motorcycle, and the like. Hereinafter, the vehicle will be described based on an example of a car.

The vehicle according to the embodiment of the present disclosure may be powered by any suitable power source, For example, the vehicle may be an internal combustion engine car having an engine as a power source, a hybrid vehicle having an engine and an electric motor as power sources, an electric vehicle having an electric motor as a power source, and the like. Also, in the following description, a left side of a vehicle refers to a left side in a driving direction of the vehicle, and a right side of the vehicle refers to a right side in the driving direction.

As illustrated in FIGS. 1 to 7, a vehicle 100 includes wheels rotated by a driving force, and a steering apparatus 510 for adjusting a driving or moving direction of the vehicle 100. As discussed above, the vehicle 100 can be an autonomous vehicle that autonomously performs driving operations for the vehicle.

Figure 7:
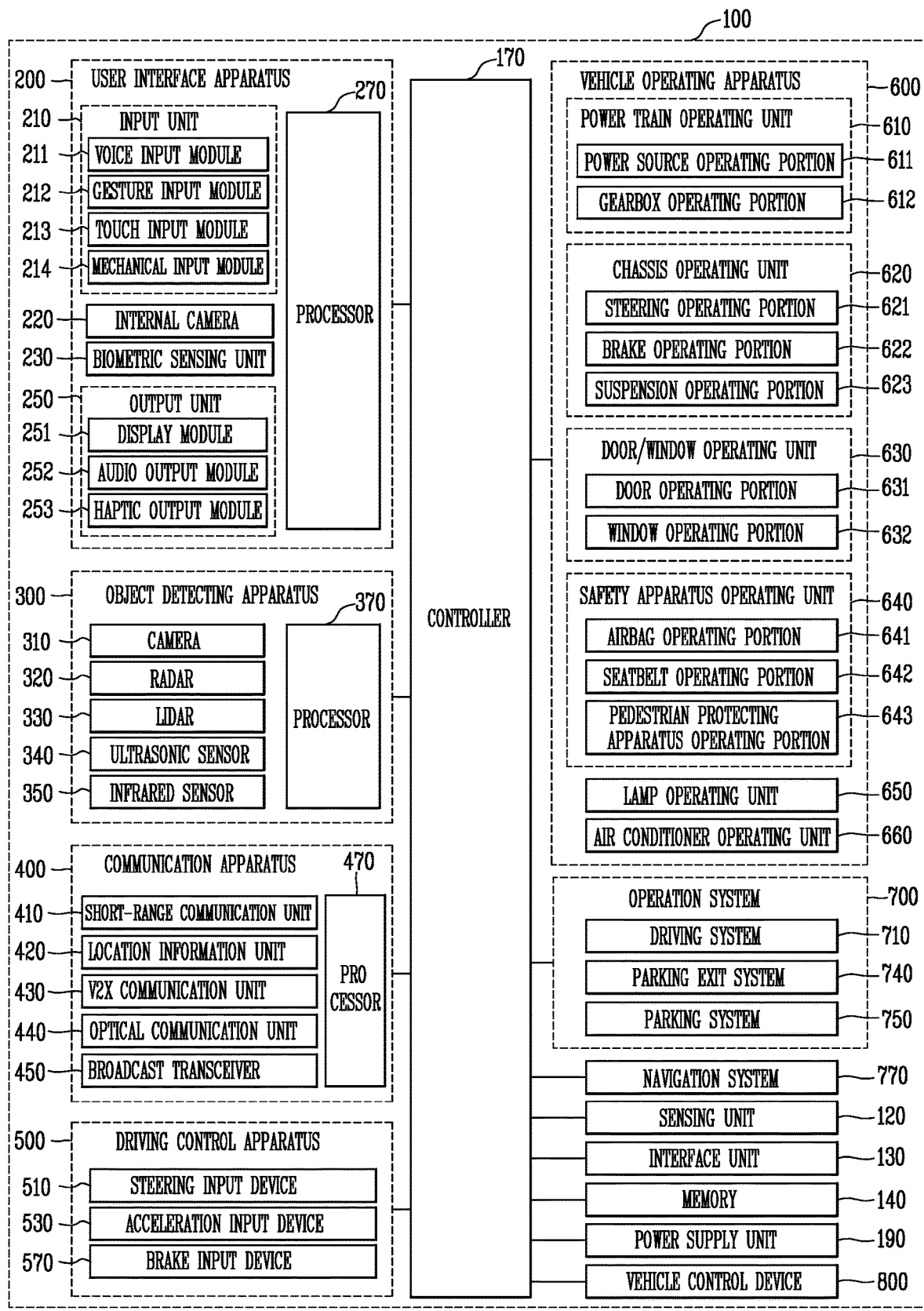
FIG. 7 is a block diagram illustrating an example of a vehicle according to an implementation of the present disclosure.

Further, the vehicle 100 can be switched between an autonomous mode and a manual mode, either based on user input and/or based on other information. The vehicle can also be converted from the manual mode into the autonomous mode or from the autonomous mode into the manual mode based on a user input received through a user interface apparatus 200, as shown in FIG. 7. For example, the vehicle 100 can be switched into the autonomous mode or into the manual mode based on driving environment information.

The vehicle 100 can be switched from the manual mode into the autonomous mode or from the autonomous module into the manual mode based on driving environment information generated in the object detecting apparatus 300, as shown in FIG. 7. The vehicle 100 can be switched from the manual mode into the autonomous mode or from the autonomous module into the manual mode based on driving environment information received through a communication apparatus 400, as shown in FIG. 7.

As another example, the vehicle 100 can be switched from the manual mode into the autonomous mode or from the autonomous module into the manual mode based on information, data, or signals provided from another device, such as an external device. When the vehicle 100 is driven in the autonomous mode, the autonomous vehicle 100 can be driven based on an operation system 700. For example, as shown in FIG. 7, the autonomous vehicle 100 can be driven based on information, data, or signals generated in a driving system 710, a parking exit system 740, and/or a parking system 750.

When the vehicle 100 is driven in the manual mode, the autonomous vehicle 100 can receive a user input for driving through a driving control apparatus 500. The vehicle 100 can be driven based on the user input received through the driving control apparatus 500, as shown in FIG. 7.

As described herein, a length of a vehicle refers to a suitable measure of length of the vehicle, such as a length from a front end to a rear end of the vehicle 100. A width of a vehicle refers to a suitable measure of the width of the vehicle 100, and a height of the vehicle refers to a suitable measure of the height of the vehicle, such as a distance from a bottom of a wheel to a roof of the vehicle. In the following description, an overall-length direction L refers to a direction which is a criterion for measuring the overall length of the vehicle 100, a width direction W refers to a direction that is a criterion for measuring a width of the vehicle 100, and a height direction H refers to a direction that is a criterion for measuring a height of the vehicle 100.

As illustrated in FIG. 7, the vehicle 100 can include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190. The vehicle 100 can include more components in addition to components to be explained in this specification or may not include some of those components to be explained in this specification.

In addition, the user interface apparatus 200 is for communication between the vehicle 100 and a user. The user interface apparatus 200 can receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270. The user interface apparatus 200 may include more components in addition to components to be explained in this specification or may not include some of those components to be explained in this specification.

In addition, the input unit 200 allows the user to input information. Data collected in the input unit 120 can be analyzed by the processor 270 and processed as a user's control command. The input unit 210 may also be disposed within the vehicle. For example, the input unit 200 can be disposed on one area of a steering wheel, one area of an instrument panel, one area of a seat, one area of each pillar, one area of a door, one area of a center console, one area of a headlining, one area of a sun visor, one area of a wind shield, one area of a window or the like. The input unit 210 may also include a voice input module 211, a gesture input module 212, a touch input module 213, and a mechanical input module 214.

Further, the audio input module 211 can convert a user's voice input into an electric signal. The converted electric signal can be provided to the processor 270 or the controller 170. The voice input module 211 may include at least one microphone, and the gesture input module 212 can covert a user's gesture input into an electric signal. The converted electric signal may be provided to the processor 270 or the controller 170. The gesture input module 212 may also include at least one of an infrared sensor and an image sensor for detecting the user's gesture input.

The gesture input module 212 can detect a user's three-dimensional (3D) gesture input. Thus, the gesture input module 212 may include a light emitting diode outputting a plurality of infrared rays or a plurality of image sensors.

The gesture input module 212 can also detect the user's 3D gesture input by a time of flight (TOF) method, a structured light method or a disparity method. The touch input module 213 can covert the user's touch input into an electric signal, and the converted electric signal can be provided to the processor 270 or the controller 170. The touch input module 213 may include a touch sensor for detecting the user's touch input.

Further, the touch input module 213 may also be integrated with the display unit 251 so as to implement a touch screen. The touch screen can provide an input interface and an output interface between the vehicle 100 and the user. Also, the mechanical input module 214 may include at least one of a button, a dome switch, a jog wheel and a jog switch. An electric signal generated by the mechanical input module 214 may be provided to the processor 270 or the controller 170. The mechanical input module 214 may be arranged on a steering wheel, a center fascia, a center console, a cockpit module, a door and the like.

Figure 3:
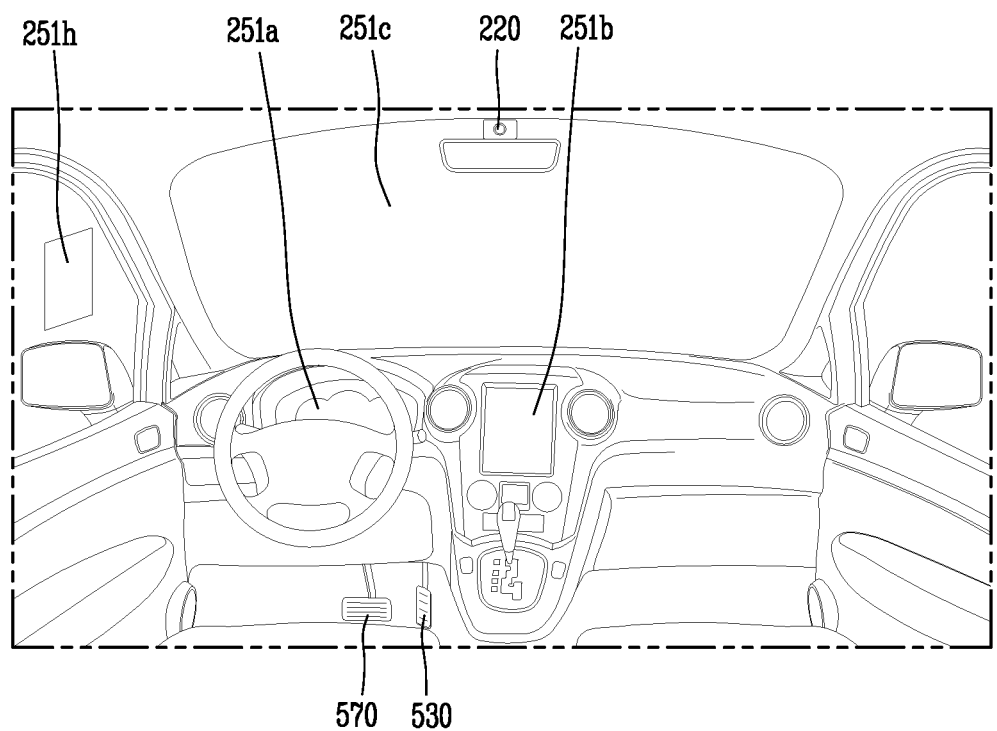
FIGS. 3 and 4 are diagrams illustrating examples of the inside of a vehicle according to an implementation of the present disclosure.

In addition, the internal camera 220 can acquire an internal image of the vehicle, for example as shown in FIG. 3. The processor 270 can then detect a user's state based on the internal image of the vehicle. The processor 270 can acquire information related to the user's gaze from the internal image of the vehicle, and can detect a user gesture from the internal image of the vehicle.

The biometric sensing unit 230 can acquire the user's biometric information and may include a sensor for detecting the user's biometric information and acquire fingerprint information and heart rate information regarding the user using the sensor. The biometric information can be used for user authentication.

The output unit 250 can generate an output related to a visual, audible or tactile signal. The output unit 250 may include at least one of a display module 251, an audio output module 252 and a haptic output module 253. The display module 251 can output graphic objects corresponding to various types of information.

In addition, the display module 251 may include at least one of a liquid crystal display (LCD), a thin film transistor-LCD (TFT LCD), an organic light-emitting diode (OLED), a flexible display, a three-dimensional (3D) display and an e-ink display. The display module 251 may be inter-layered or integrated with a touch input module 213 to implement a touch screen.

The display module 251 may be implemented as a head up display (HUD). When the display module 251 is implemented as the HUD, the display module 251 can be provided with a projecting module so as to output information through an image which is projected on a windshield or a window. The display module 251 may include a transparent display that can be attached to the windshield or the window.

Further, the transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may also have adjustable transparency.

Figure 4:
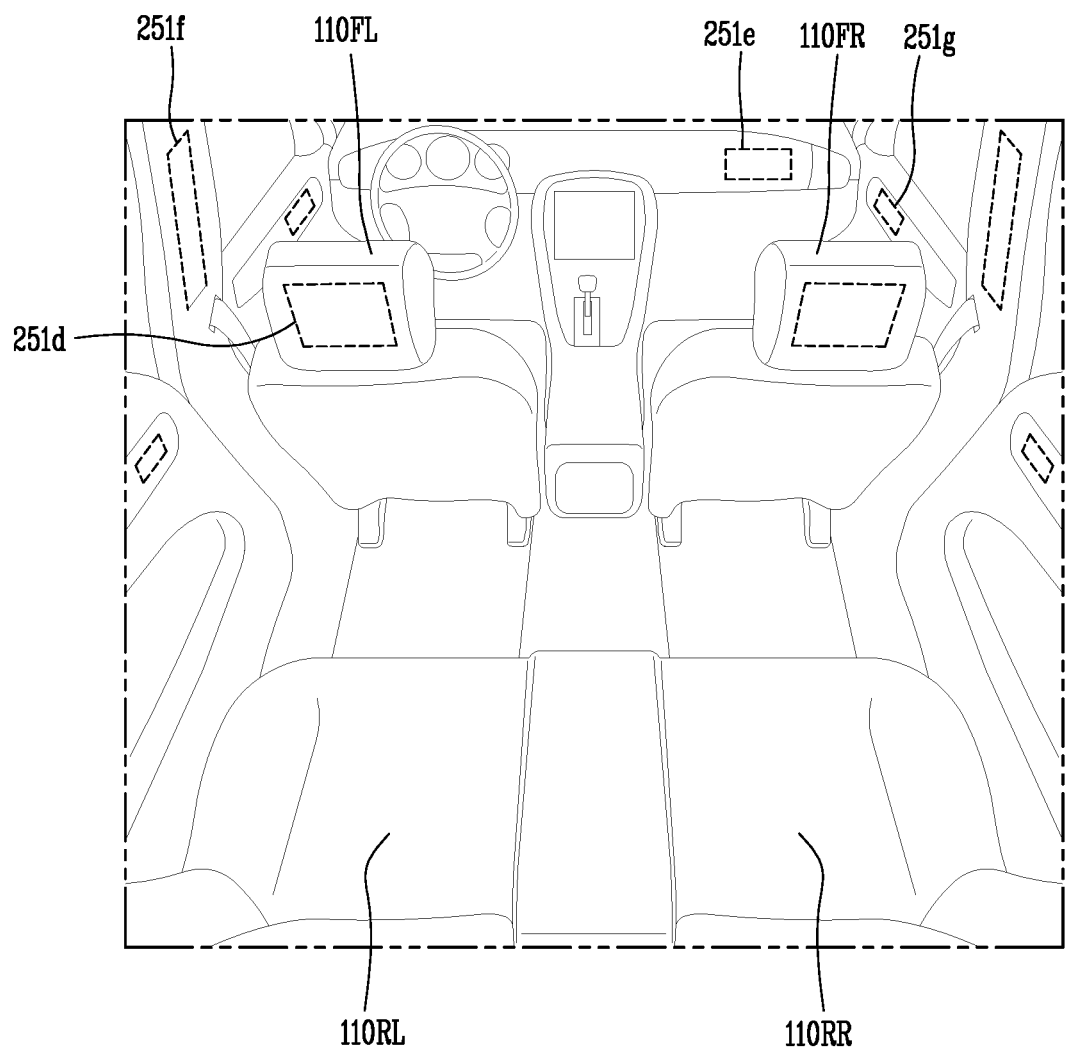
Figure 6:
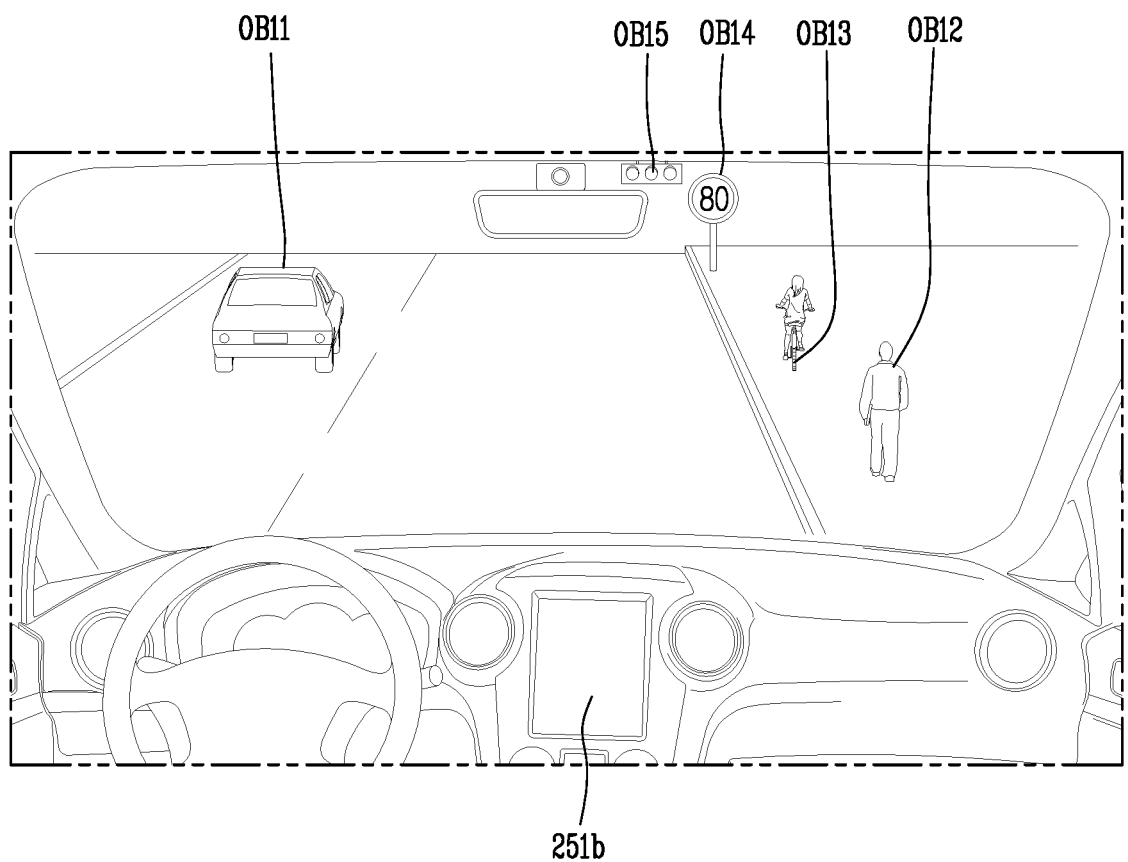

The user interface apparatus 200 may include a plurality of display modules 251a to 251g, as shown in the examples of FIGS. 3, 4, and 6. The display module 251 can be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

In addition, the audio output module 252 converts an electric signal provided from the processor 270 or the controller 170 into an audio signal for output. Thus, the audio output module 252 may include at least one speaker. Also, the haptic output module 253 generates a tactile output. For example, the haptic output module 253 can vibrate the steering wheel, a safety belt, or a seat 110FL, 110FR, 110RL, 110RR (as shown in FIG. 4) such that the user can recognize such output.

The processor 270 can also control an overall operation of each unit of the user interface apparatus 200. Further, the user interface apparatus 200 may include a plurality of processors 270 or may not include any processor 270. When the processor 270 is not included in the user interface apparatus 200, the user interface apparatus 200 can operate according to a control of a processor of another apparatus within the vehicle 100 or the controller 170.

The user interface apparatus 200 may also be a display apparatus for the vehicle. The user interface apparatus 200 can operate according to the control of the controller 170. The object detecting apparatus 300 can detect an object located at outside of the vehicle 100. The object may be a variety of objects associated with driving (operation) of the vehicle 100.

Figure 5:
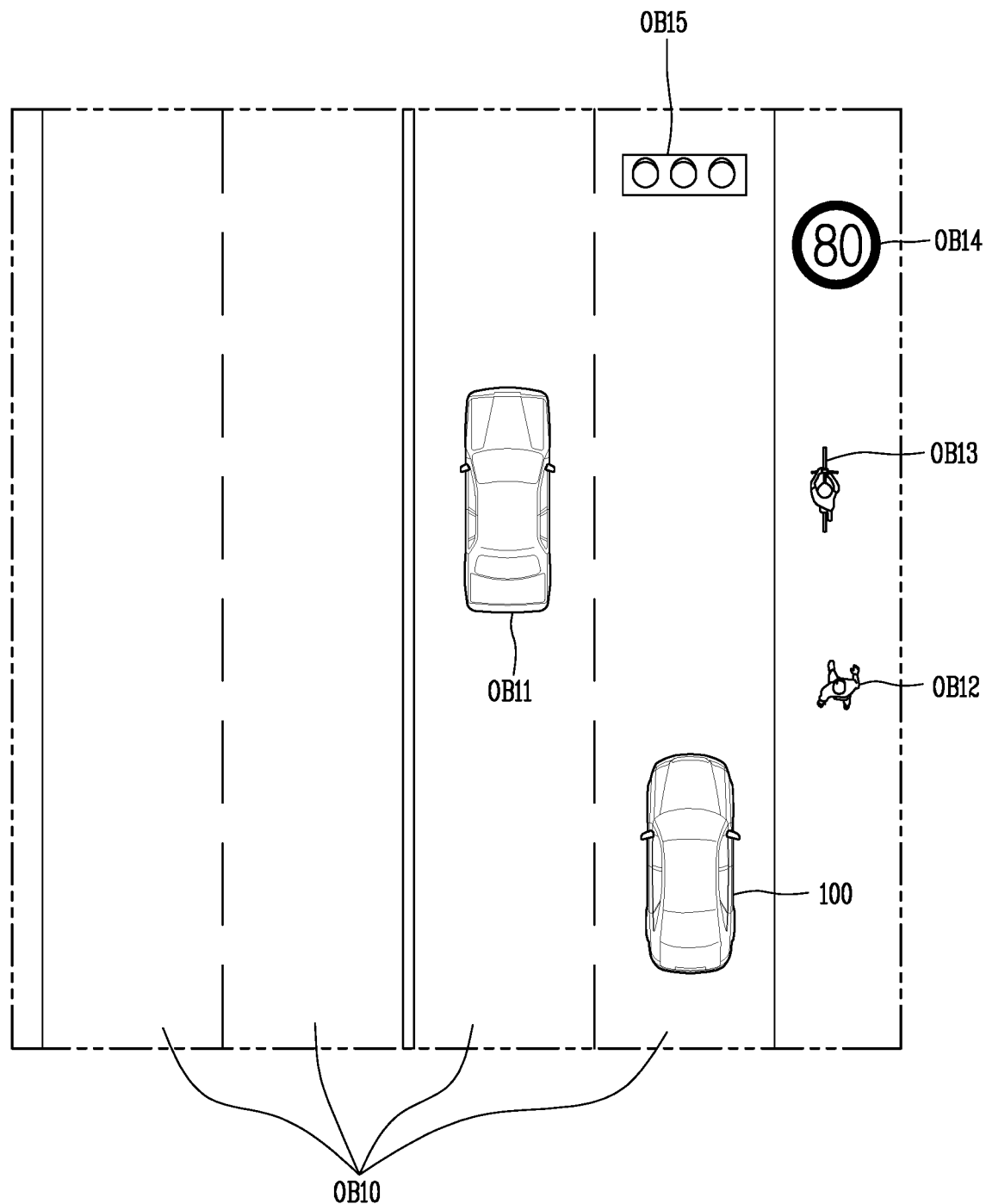
FIGS. 5 and 6 are diagrams illustrating examples of an object according to an implementation of the present disclosure.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like. The lane OB10 may be a driving lane, a lane next to the driving lane or a lane on which another vehicle comes in an opposite direction to the vehicle 100. As an example, the lane OB10 may include left and right lines forming a lane.

The other vehicle OB11 may be a vehicle which is moving around the vehicle 100 or a vehicle located within a predetermined distance from the vehicle 100. For example, the other vehicle OB11 may be a vehicle which moves before or after the vehicle 100.

Also, the pedestrian OB12 may be a person located near the vehicle 100 or a person located within a predetermined distance from the vehicle 100. For example, the pedestrian OB12 may be a person located on a sidewalk or roadway. In addition, the two-wheeled vehicle OB13 may refer to a vehicle (transportation facility) that is located near the vehicle 100 and moves using two wheels or may be a vehicle that is located within a predetermined distance from the vehicle 100 and has two wheels. For example, the two-wheeled vehicle OB13 may be a motorcycle or a bicycle that is located on a sidewalk or roadway.

The traffic signals include, for example, a traffic light OB15, a traffic sign OB14, or a pattern or text drawn on a road surface. The light may be light emitted from a lamp provided on another vehicle or light generated from a streetlamp. The light can also be solar light. Further, the road may include a road surface, a curve, an upward slope, a downward slope and the like.

The structure can be an object that is located near a road and fixed on the ground. For example, the structure includes a streetlamp, a roadside tree, a building, an electric pole, a traffic light, a bridge and the like. The geographical feature also includes include a mountain, a hill and the like.

In addition, objects can be classified as a moving object or a fixed object. For example, the moving object includes another vehicle, a pedestrian, or other suitable moving objects around the vehicle. The fixed object may include a traffic signal, a road, a structure, or other suitable fixed objects in the environment of the vehicle.

Further, the object detecting apparatus 300 may include a camera 310, a radar 320, a LiDAR 330, an ultrasonic sensor 340, an infrared sensor 350 and a processor 370. Also, the object detecting apparatus 300 may further include other components in addition to the components described, or may not include some of the components described.

Figure 2:
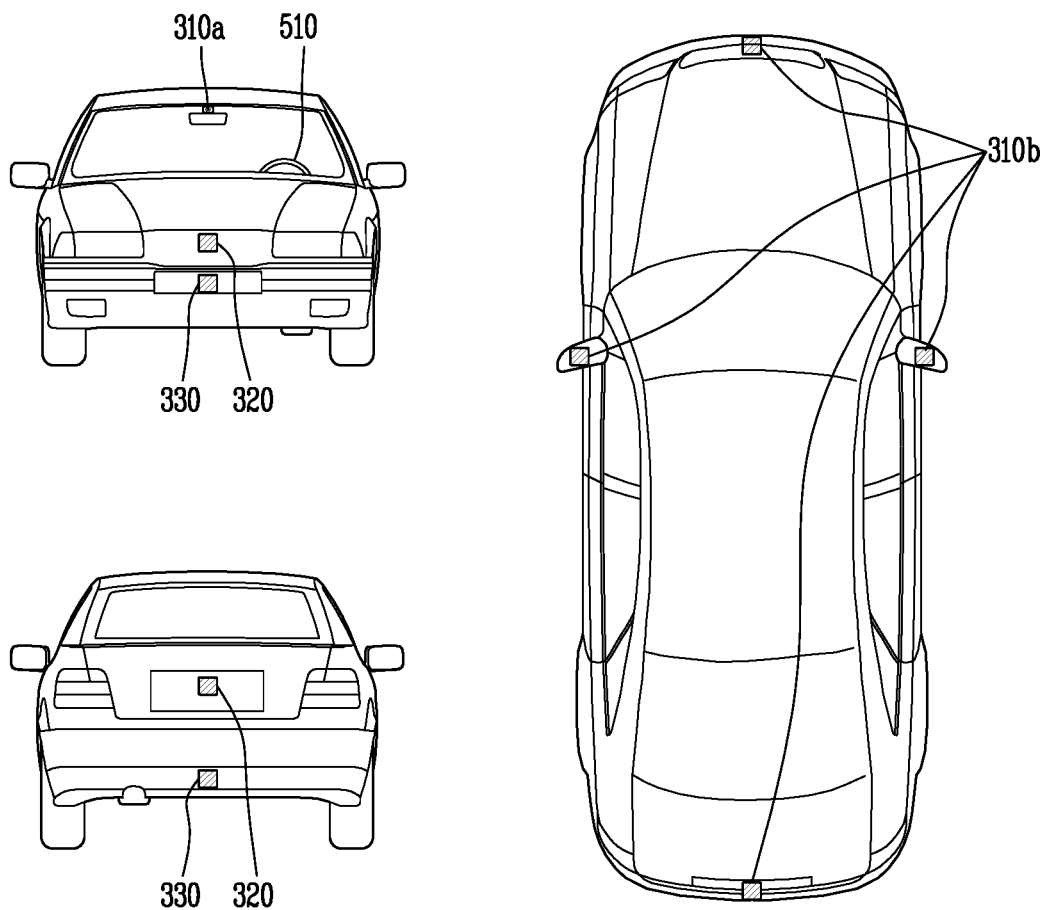
FIG. 2 is a diagram illustrating an example of a vehicle according to an implementation of the present disclosure viewed at various angles.

The camera 310 can be located on an appropriate portion outside the vehicle to acquire an external image of the vehicle. For example, as shown in FIGS. 1 and 2, the camera 310 may be a mono camera, a stereo camera 310a, an around view monitoring (AVM) camera 310b, or a 360-degree camera. For example, the camera 310 can be disposed adjacent to a front windshield within the vehicle to acquire a front image of the vehicle. Or, the camera 310 can be disposed adjacent to a front bumper or a radiator grill.

For example, the camera 310 can be disposed adjacent to a rear glass within the vehicle to acquire a rear image of the vehicle. Or, the camera 310 can be disposed adjacent to a rear bumper, a trunk or a tail gate. For example, the camera 310 can be disposed adjacent to at least one of side windows within the vehicle to acquire a side image of the vehicle. Or, the camera 310 can be disposed adjacent to a side mirror, a fender or a door.

In addition, the camera 310 can provide an acquired image to the processor 370. The radar 320 may include electric wave transmitting and receiving portions and can be implemented as a pulse radar or a continuous wave radar according to a principle of emitting electric waves. The radar 320 may also be implemented in a frequency modulated continuous wave (FMCW) manner or a frequency shift Keyong (FSK) manner according to a signal waveform, among the continuous wave radar methods.

The radar 320 can detect an object in a time of flight (TOF) manner or a phase-shift manner through the medium of the electric wave, and detect a position of the detected object, a distance from the detected object and a relative speed with the detected object. The radar 320 can be disposed on an appropriate position outside the vehicle for detecting an object which is located at a front, rear or side of the vehicle, as shown in the example of FIG. 2.

The LiDAR 330 may include laser transmitting and receiving portions. The LiDAR 330 may be implemented in a time of flight (TOF) manner or a phase-shift manner. Further, the LiDAR 330 may be implemented as a drive type or a non-drive type. For the drive type, the LiDAR 330 can be rotated by a motor and detect object near the vehicle 100.

For the non-drive type, the LiDAR 330 can detect, through light steering, objects which are located within a predetermined range based on the vehicle 100. The vehicle 100 can include a plurality of non-drive type LiDARs 330. The LiDAR 330 can detect an object in a TOP manner or a phase-shift manner through the medium of a laser beam, and detect a position of the detected object, a distance from the detected object and a relative speed with the detected object.

The LiDAR 330 can be disposed on an appropriate position outside the vehicle for detecting an object located at the front, rear or side of the vehicle, as shown in the example of FIG. 2. The ultrasonic sensor 340 may include ultrasonic wave transmitting and receiving portions. The ultrasonic sensor 340 can detect an object based on an ultrasonic wave, and detect a position of the detected object, a distance from the detected object and a relative speed with the detected object.

The ultrasonic sensor 340 can be disposed on an appropriate position outside the vehicle for detecting an object located at the front, rear or side of the vehicle. The infrared sensor 350 may include infrared light transmitting and receiving portions. The infrared sensor 340 can detect an object based on infrared light, and detect a position of the detected object, a distance from the detected object and a relative speed with the detected object.

The infrared sensor 350 can be disposed on an appropriate position outside the vehicle for detecting an object located at the front, rear or side of the vehicle. The processor 370 can control an overall operation of each unit of the object detecting apparatus 300.

The processor 370 can detect an object based on an acquired image, and track the object. The processor 370 can execute operations, such as a calculation of a distance from the object, a calculation of a relative speed with the object and the like, through an image processing algorithm.

The processor 370 can detect an object based on a reflected electromagnetic wave which an emitted electromagnetic wave is reflected from the object, and track the object. The processor 370 can execute operations, such as a calculation of a distance from the object, a calculation of a relative speed with the object and the like, based on the electromagnetic wave.

The processor 370 can detect an object based on a reflected laser beam which an emitted laser beam is reflected from the object, and track the object. The processor 370 can also execute operations, such as a calculation of a distance from the object, a calculation of a relative speed with the object and the like, based on the laser beam.

Further, the processor 370 can detect an object based on a reflected ultrasonic wave which an emitted ultrasonic wave is reflected from the object, and track the object. The processor 370 can also execute operations, such as a calculation of a distance from the object, a calculation of a relative speed with the object and the like, based on the ultrasonic wave. The processor can detect an object based on reflected infrared light which emitted infrared light is reflected from the object, and track the object. In addition, the processor 370 can execute operations, such as a calculation of a distance from the object, a calculation of a relative speed with the object and the like, based on the infrared light.

Further, the object detecting apparatus 300 may include a plurality of processors 370 or may not include any processor 370. For example, each of the camera 310, the radar 320, the LiDAR 330, the ultrasonic sensor 340 and the infrared sensor 350 can include the processor in an individual manner.

When the processor 370 is not included in the object detecting apparatus 300, the object detecting apparatus 300 can operate according to the control of a processor of an apparatus within the vehicle 100 or the controller 170. The object detecting apparatus 300 can operate according to the control of the controller 170.

The communication apparatus 400 performs communication with an external device. Here, the external device may be another vehicle, a mobile terminal or a server. The communication apparatus 400 can perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470. Further, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication unit 410 can construct short-range area networks to perform short-range communication between the vehicle 100 and at least one external device.

The location information unit 420 acquires position information. For example, the location information unit 420 may include a Global Positioning System (GPS) module or a Differential Global Positioning System (DGPS) module. The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 performs communication with an external device through the medium of light. The optical communication unit 440 may include a light-emitting diode for converting an electric signal into an optical signal and sending the optical signal to the exterior, and a photodiode for converting the received optical signal into an electric signal. Also, the light-emitting diode may be integrated with lamps provided on the vehicle 100.

The broadcast transceiver 450 can receive a broadcast signal from an external broadcast managing entity or transmit a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 can control an overall operation of each unit of the communication apparatus 400. Also, the communication apparatus 400 may include a plurality of processors 470 or may not include any processor 470. When the processor 470 is not included in the communication apparatus 400, the communication apparatus 400 can operate according to the control of a processor of another device within the vehicle 100 or the controller 170.

The communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 can operate according to the control of the controller 170. Further, the driving control apparatus 500 can receive a user input for driving. In a manual mode, the vehicle 100 can be operated based on a signal provided by the driving control apparatus 500.

The driving control apparatus 500 may include a steering input device 510, an acceleration input device 530 and a brake input device 570, as shown in the example of FIG. 3. The steering input device 510 can receive an input regarding a driving (ongoing) direction of the vehicle 100 from the user. The steering input device 510 is preferably a wheel allowing a steering input in a rotating manner. However, the steering input device can also include a touch screen, a touchpad or a button.

The acceleration input device 530 can receive an input for accelerating the vehicle 100 from the user, and the brake input device 570 can receive an input for braking the vehicle 100 from the user. Each of the acceleration input device 530 and the brake input device 570 is preferably a pedal. However, the acceleration input device or the brake input device may also be configured in a shape of a touch screen, a touchpad or a button.

The driving control apparatus 500 can operate according to the control of the controller 170. Further, the vehicle operating apparatus 600 electrically controls operations of various devices within the vehicle 100. The vehicle operating apparatus 600 may also include a power train operating unit 610, a chassis operating unit 620, a door/window operating unit 630, a safety apparatus operating unit 640, a lamp operating unit 650, and an air-conditioner operating unit 660.

In addition, the vehicle operating apparatus 600 may further include other components in addition to the components described, or may not include some of the components described. The vehicle operating apparatus 600 may also include a processor. Each unit of the vehicle operating apparatus 600 may individually include a processor.

Further, the power train operating unit 610 can control an operation of a power train device. The power train operating unit 610 may include a power source operating portion 611 and a gearbox operating portion 612. The power source operating portion 611 can perform a control for a power source of the vehicle 100.

For example, upon using a fossil fuel-based engine as the power source, the power source operating portion 611 can perform an electronic control for the engine. Accordingly, an output torque and the like of the engine can be controlled. The power source operating portion 611 can adjust the engine output torque according to the control of the controller 170.

For example, upon using an electric energy-based motor as the power source, the power source operating portion 611 can perform a control for the motor. The power source operating portion 611 can adjust a rotating speed, a torque and the like of the motor according to the control of the controller 170.

The gearbox operating portion 612 can perform a control for a gearbox. The gearbox operating portion 612 can adjust a state of the gearbox. The gearbox operating portion 612 can change the state of the gearbox into drive (forward) (D), reverse (R), neutral (N) or parking (P). When an engine is the power source, the gearbox operating portion 612 can adjust a locked state of a gear in the drive (D) state.

The chassis operating unit 620 can control an operation of a chassis device. The chassis operating unit 620 may include a steering operating portion 621, a brake operating portion 622 and a suspension operating portion 623. The steering operating portion 621 can perform an electronic control for a steering apparatus within the vehicle 100. The steering operating portion 621 can change a driving direction of the vehicle.

Further, the brake operating portion 622 can perform an electronic control for a brake apparatus within the vehicle 100. For example, the brake operating portion 622 can control an operation of brakes provided at wheels to reduce speed of the vehicle 100. The brake operating portion 622 may individually control each of a plurality of brakes. The brake operating portion 622 may differently control braking force applied to each of a plurality of wheels.

The suspension operating portion 623 can perform an electronic control for a suspension apparatus within the vehicle 100. For example, the suspension operating portion 623 can control the suspension apparatus to reduce vibration of the vehicle 100 when a bump is present on a road. The suspension operating portion 623 may individually control each of a plurality of suspensions.

The door/window operating unit 630 can perform an electronic control for a door apparatus or a window apparatus within the vehicle 100. The door/window operating unit 630 may include a door operating portion 631 and a window operating portion 632.

In addition, the door operating portion 631 can perform the control for the door apparatus such as opening or closing of a plurality of doors of the vehicle 100. The door operating portion 631 can control opening or closing of a trunk or a tail gate and control opening or closing of a sunroof.

The window operating portion 632 can perform the electronic control for the window apparatus. The window operating portion 632 can control opening or closing of a plurality of windows of the vehicle 100. Further, the safety apparatus operating unit 640 can perform an electronic control for various safety apparatuses within the vehicle 100.

The safety apparatus operating unit 640 may include an airbag operating portion 641, a seatbelt operating portion 642 and a pedestrian protecting apparatus operating portion 643. The airbag operating portion 641 can perform an electronic control for an airbag apparatus within the vehicle 100. For example, the airbag operating portion 641 can control the airbag to be deployed upon a detection of a risk.

The seatbelt operating portion 642 can perform an electronic control for a seatbelt apparatus within the vehicle 100. For example, the seatbelt operating portion 642 can control passengers to be motionlessly seated in seats 110FL, 110FR, 110RL, 110RR using seatbelts upon a detection of a risk.

The pedestrian protecting apparatus operating portion 643 can perform an electronic control for a hood lift and a pedestrian airbag. For example, the pedestrian protecting apparatus operating portion 643 can control the hood lift and the pedestrian airbag to be open up upon detecting pedestrian collision. The lamp operating unit 650 can perform an electronic control for various lamp apparatuses within the vehicle 100.

The air-conditioner operating unit 660 can perform an electronic control for an air conditioner within the vehicle 100. For example, the air-conditioner operating unit 660 can control the air conditioner to supply cold air into the vehicle when internal temperature of the vehicle is high.

The vehicle operating apparatus 600 may include a processor. Each unit of the vehicle operating apparatus 600 may individually include a processor. The vehicle operating apparatus 600 can operate according to the control of the controller 170. The operation system 700 controls various driving modes of the vehicle 100 and may include a driving system 710, a parking exit system 740 and a parking system 750.

The operation system 700 may further include other components in addition to components to be described, or may not include some of the components to be described. The operation system 700 may include a processor. Each unit of the operation system 700 may individually include a processor.

The operation system may be implemented by one or more processors, for example the controller 170, when implemented in a software configuration. The operation system 700 may also include at least one of the user interface apparatus 200, the object detecting apparatus 300, the communication apparatus 400, the vehicle operating apparatus 600, or the controller 170.

The driving system 710 can perform driving of the vehicle 100. The driving system 710 can receive navigation information from a navigation system 770, transmit a control signal to the vehicle operating apparatus 600, and perform driving of the vehicle 100. The driving system 710 can receive object information from the object detecting apparatus 300, transmit a control signal to the vehicle operating apparatus 600 and perform driving of the vehicle 100.

The driving system 710 can receive a signal from an external device through the communication apparatus 400, transmit a control signal to the vehicle operating apparatus 600, and perform driving of the vehicle 100. In addition, the parking exit system 740 can perform an exit of the vehicle 100 from a parking lot. The parking exit system 740 can receive navigation information from the navigation system 770, transmit a control signal to the vehicle operating apparatus 600, and perform the exit of the vehicle 100 from the parking lot.

The parking exit system 740 can receive object information from the object detecting apparatus 300, transmit a control signal to the vehicle operating apparatus 600 and perform the exit of the vehicle 100 from the parking lot. In addition, the parking exit system 740 can receive a signal from an external device through the communication apparatus 400, transmit a control signal to the vehicle operating apparatus 600, and perform the exit of the vehicle 100 from the parking lot.

The parking system 750 can perform parking of the vehicle 100, receive navigation information from the navigation system 770, transmit a control signal to the vehicle operating apparatus 600, and park the vehicle 100. In addition, the parking system 750 can receive object information from the object detecting apparatus 300, transmit a control signal to the vehicle operating apparatus 600 and park the vehicle 100.

Further, the parking system 750 can receive a signal from an external device through the communication apparatus 400, transmit a control signal to the vehicle operating apparatus 600, and park the vehicle 100. The navigation system 770 can provide navigation information. The navigation information may include at least one of map information, information regarding a set destination, path information according to the set destination, information regarding various objects on a path, lane information and current location information of the vehicle.

The navigation system 770 may include a memory and a processor. The memory can store the navigation information. Also, the processor can control an operation of the navigation system 770. The navigation system 770 can update prestored information by receiving information from an external device through the communication apparatus 400. The navigation system 770 may also be classified as a sub component of the user interface apparatus 200.

In addition, the sensing unit 120 can sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 can acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

In addition, the interface unit 130 can serve as a path allowing the vehicle 100 to interface with various types of external devices connected thereto. For example, the interface unit 130 can be provided with a port connectable with a mobile terminal, and connected to the mobile terminal through the port. In this instance, the interface unit 130 may exchange data with the mobile terminal.

The interface unit 130 can serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

In addition, the memory 140 is electrically connected to the controller 170. The memory 140 can store basic data for units, control data for controlling operations of units and input/output data. The memory 140 may be a variety of storage devices, such as ROM, RAM, EPROM, a flash drive, a hard drive and the like in a hardware configuration. Further, the memory 140 can store various data for overall operations of the vehicle 100, such as programs for processing or controlling the controller 170. The memory 140 may be integrated with the controller 170 or implemented as a sub component of the controller 170.

The controller 170 can control an overall operation of each unit of the vehicle 100. The controller 170 may be referred to as an Electronic Control Unit (ECU). The power supply unit 190 may supply power required for an operation of each component according to the control of the controller 170. Specifically, the power supply unit 190 can receive power supplied from an internal battery of the vehicle, and the like.

At least one processor and the controller 170 included in the vehicle 100 can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

An autonomous driving system using the aforementioned autonomous driving vehicle 100 will now be described in detail. As the autonomous driving vehicle 100 is developed, the autonomous driving vehicle 100 can perform autonomous driving for a vehicle owner and a third party, rather than the vehicle owner, as well. For example, when the vehicle owner transfers authority to control his or her vehicle to a preset server, the server can receive a request of a third party and transmit a control command to the autonomous driving vehicle 100.

In addition, the autonomous driving vehicle 100 can move to a starting point (or a departure point) from which the third party wants to depart, and when the third party gets in the autonomous driving vehicle 100 at the starting point, the autonomous driving vehicle 100 can transport the third party to a destination. That is, the autonomous driving vehicle 100 can be used as a taxi.

The third party may pay cost based on a movement distance, a movement time, and the like, and the server can remit or transfer the balance excluding a commission from the paid cost to an account of the vehicle owner. Accordingly, the vehicle owner can make a profit on his or her vehicle, while performing a task when the vehicle owner does not use his or her vehicle.

However, when the autonomous driving vehicle 100 is used as a means of transportation, since there is no driver managing the autonomous driving vehicle 100 in the autonomous driving vehicle 100, various problems may arise. Thus, the present disclosure provides an autonomous driving vehicle that mitigates various problems that may arise when a vehicle is used as a means of transportation without a driver, and an autonomous driving system including the same.

Figure 8:
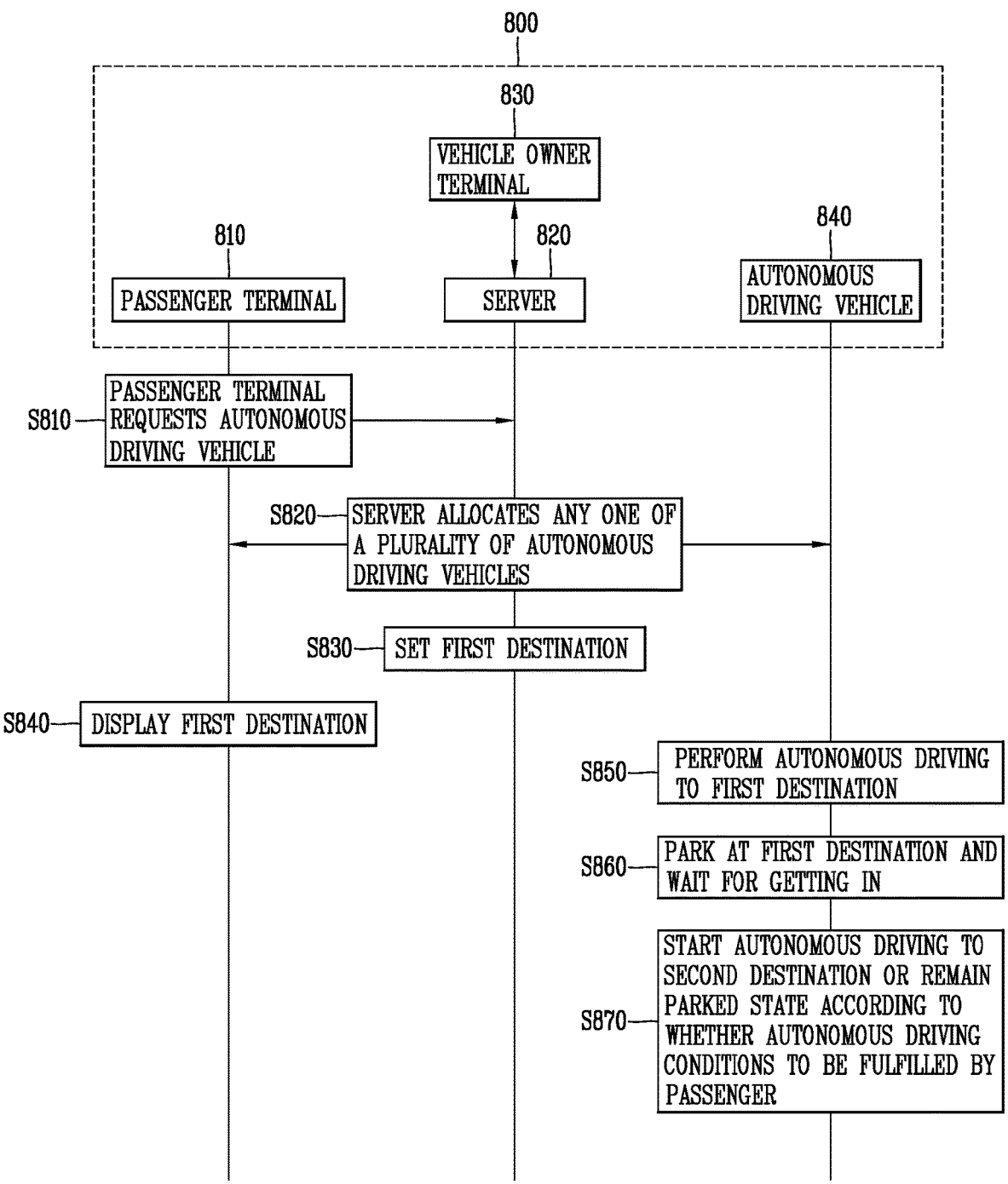
FIG. 8 is a flow chart illustrating an example of operations of a terminal, a server, and an autonomous driving vehicle in an autonomous driving system according to the present disclosure.
Figure 9:
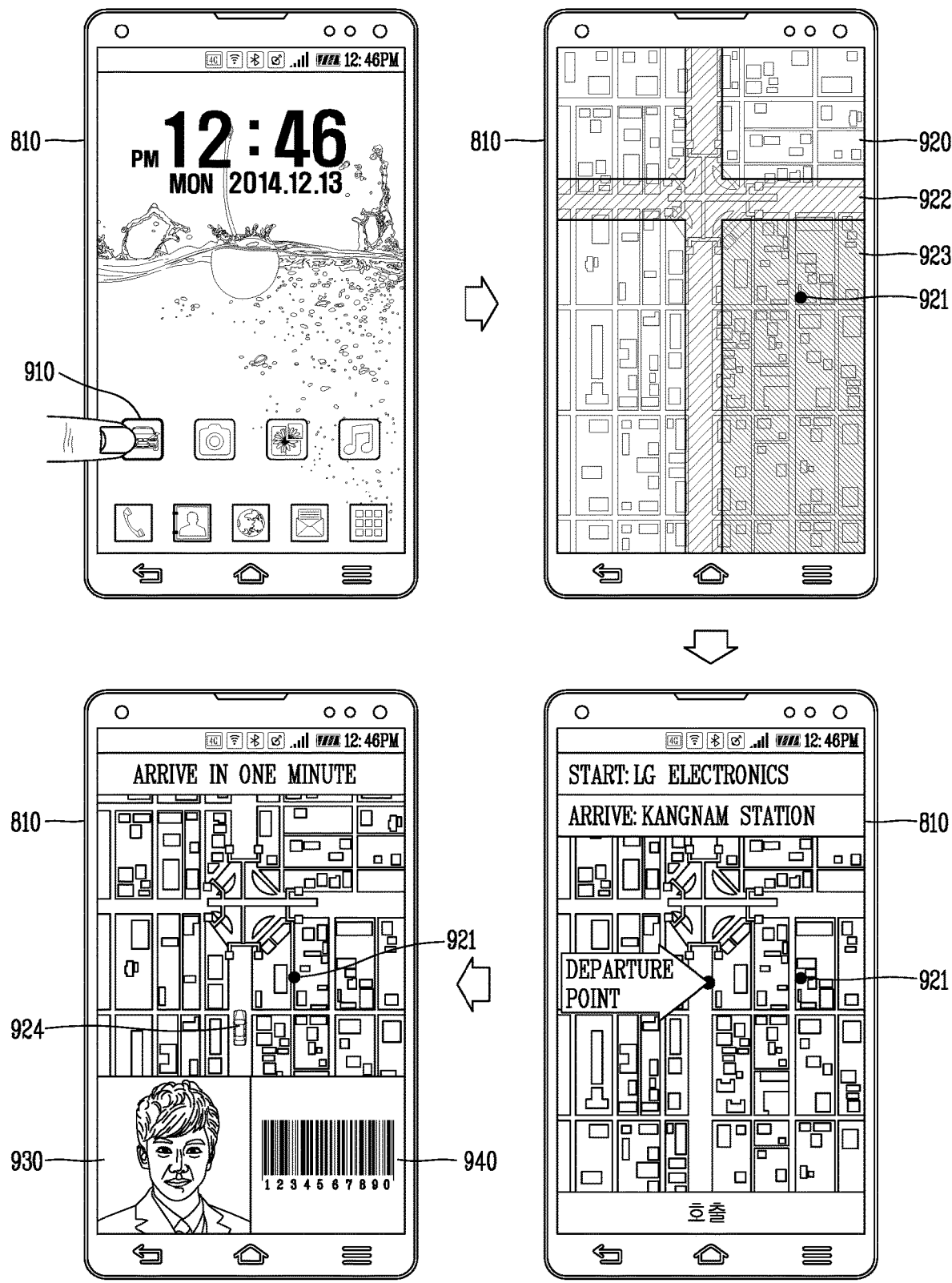
FIG. 9 is a diagram illustrating an example of requesting an autonomous driving vehicle by a terminal.

In more detail, FIG. 8 is a flow chart illustrating operations of a terminal, a server, and an autonomous driving vehicle in an autonomous driving system according to the present disclosure, and FIG. 9 is a view illustrating an example of requesting an autonomous driving vehicle by a terminal. An autonomous driving system 800 may include a passenger terminal 810, a server 820, a vehicle owner terminal 830, and an autonomous driving vehicle 840. A service provided by the autonomous driving system 800 will be referred to as an "autonomous driving taxi service".

The autonomous driving taxi service can start as the passenger terminal 810 requests the autonomous driving vehicle from the server 820 (S810). The passenger terminal 810 refers to a terminal, and the terminal described in the present disclosure may include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

In the passenger terminal 810, an application for providing the autonomous driving taxi service is installed, and a home screen page displayed on the passenger terminal 810 may include an icon 910 of the application. For example, as illustrated in FIG. 9, a user of the passenger terminal 810 can enter a user interface provided by the autonomous driving taxi service by touching the icon 910 of the application.

The user of the passenger terminal 810 may be referred to as a "subscriber" in that he or she reserves the autonomous driving taxi service. After inputting a destination using the user interface, the subscriber can request an autonomous driving vehicle to assist movement to the destination from the server 820. Unlike the destination, a departure point can be automatically set to a point corresponding to a location of the passenger terminal 810, or a certain point may be set as a departure point by a user input.

The passenger terminal 810 can display a map 920 for setting a departure point and/or a destination. The map 920 can display a first graphic object 921 (e.g., a small circle or dot) that represents the location of the passenger terminal 810. Also, a road may be classified as either a road that permits driving of an autonomous driving vehicle, or a road that prohibits driving of an autonomous driving vehicle.

In displaying the map 920 including the point where the passenger terminal 810 is located, the passenger terminal 810 can display a geographic area in which the passenger (the user) may enter with the vehicle, and a geographic area in which the passenger can not enter with the vehicle. For example, as illustrated in FIG. 9, the map 920 can display at least one of a first image 922 representing autonomous driving permitted area, and a second image 923 representing an autonomous driving prohibited area (into which the autonomous driving vehicle is not permitted to enter).

Accordingly, the subscriber can set a departure point in the area where autonomous driving vehicle is permitted to enter. That is, in setting the department point, the subscriber can exclude the road in which he or she cannot get on (or get in) the autonomous driving vehicle 820. The passenger terminal 810 can set usage conditions including a departure point and a destination based on a user input.

In addition, the subscriber can select a total number of passengers to get in, a type of a vehicle the subscriber wants to get in, and various options using the passenger terminal 810. The various options may be a vehicle including a car seat, a vehicle allowing for a user to get in by a wheelchair, a smoking available vehicle, a vehicle with a refrigerator, a vehicle in which a load equal to or greater than a predetermined size is permitted to be burdened, a vehicle in which seats have a hot wire, and the like. That is, usage conditions including various options, as well as the departure point and the destination, can be set by the subscriber.

The passenger terminal 810 transmits a "use request" including the usage conditions to the server 820. In response to the use request from the passenger terminal 810, the server 820 allocates any one of a plurality of autonomous driving vehicles (S820). Here, "allocation" refers to "setting a service providing vehicle to provide the autonomous driving taxi service to reach a destination corresponding to a use request".

The server 820 can allocate at least one autonomous driving vehicle based on the usage conditions among registered autonomous driving vehicles. When a total number of passengers to get in is smaller than a reference, the server 820 can allocate a single vehicle, and when the total number of passengers is equal to or greater than the reference, the server 820 can allocate a plurality of vehicles as service providing vehicles.

The server 820 serves as a medium connecting the passenger terminal 810 and the autonomous driving vehicle 840. Thus, information regarding the vehicle and information regarding a passenger are stored in the server 820. The information regarding the vehicle may include information regarding characteristics of the vehicle, information regarding an owner of the vehicle, and constraints set in the vehicle.

The characteristics of the vehicle may include at least one of a type of the vehicle, an article provided in the vehicle, an available space of a trunk, and an accessory that may be used by the handicapped. Information regarding an owner of the autonomous driving vehicle may include a profile and a contact number of the owner.

The constraints set in the vehicle, conditions set by the vehicle owner, may include a limited time during which the autonomous driving taxi service is provided, a limited area, a service that may be provided by the vehicle or a service that may not be provided in the vehicle. For example, the vehicle owner can limit the limited time to week days during which the vehicle owner does not use the vehicle. In this instance, the corresponding autonomous driving vehicle may not be used for the autonomous driving taxi service during weekend. In another example, when a limited area is limited to California, the autonomous driving vehicle may not be used for an autonomous driving taxi service moving outside California.

Information regarding a passenger can include at least one of personal information such as a name, a sex, a picture, age, and the like, of a passenger, a payment unit used to pay a service charge, a preferred option, and history information using the autonomous driving taxi service. The server 820 can search for an autonomous driving vehicle located within a predetermined range centered on a location of the passenger terminal 810, and request use of the searched autonomous driving vehicle from an owner of the searched autonomous driving vehicle. For example, the server 820 can request use of the autonomous driving vehicle from the "terminal 830 of the vehicle owner" registered as a terminal of the owner based on the use request.

In addition, the server 820 can search for one or more candidate vehicles based on usage conditions included in the use request, and transmit an "approval request" to the terminal 830 of a vehicle owner of a searched candidate vehicle. The approval request may include usage conditions included in the use request and estimated profits that may be made in the event of approval. Also, the approval request may further include information regarding a subscriber.

The estimated profits can be calculated by an algorithm stored in the server 820, and be varied depending on at least one of characteristics of a vehicle, a time required to move from a departure point to a destination, a movement distance, and a total number of passengers. The approval request can be output to the terminal 830 of the vehicle owner through a push message. The vehicle owner can also check the use request through the approval request, and determine whether to approve or reject the use request.

When the vehicle owner approves the use request, an "approval acceptance" can be transmitted from the terminal 830 of the vehicle owner to the server 820, and the server 820 can allocate the vehicle corresponding to the approval acceptance as a service providing vehicle. However, when the vehicle owner rejects the use request, an "approval rejection" can be transmitted from the terminal 830 of the vehicle owner to the server 820, and the server 820 can exclude a vehicle corresponding to the approval rejection from a candidate vehicle.

When there is a prior approval from the vehicle owner, transmission of the approval request may be omitted. That is, when a certain candidate vehicle is a previously approved vehicle, the server 820 can directly allocate the candidate vehicle as a service providing vehicle without asking for an intention of the vehicle owner.

In addition, the server 820 searches for a candidate vehicle satisfying the usage conditions, and here, the server 820 can allocate a candidate vehicle whose estimated time of arrival is earliest, among candidate vehicles satisfying the usage conditions, as a service providing vehicle. The estimated time of arrival may be defined as a time required for the candidate vehicle to move to a location of the passenger terminal 910.

When searching for a candidate vehicle, the server 820 can determine whether the vehicle can reach a destination based on an amount of fuel of the vehicle, and when the vehicle cannot reach the destination, the server 820 can exclude the vehicle from the candidate vehicles. When at least one vehicle is allocated, the server 820 transmits "allocation completion" to the passenger terminal 810 and/or the autonomous driving vehicle 840.

After the allocation is completed, driving information transmitted from the autonomous driving vehicle 840 can be transferred to the passenger terminal 810. Based on the transferred driving information, the passenger terminal 810 can display a second graphic object, such as the second graphic object 924 shown in FIG. 9, that represents a location of the autonomous driving vehicle 840 on the map 920.

Thereafter, the server 820 can set a first destination in response to a use request (S830). Here, the first destination may be termed a "departure point" as a spot at which the subscriber is to get in the autonomous driving vehicle 840. A first destination to which the autonomous driving vehicle 840 moves to allow a passenger to get in corresponds to a first destination, and a second destination to which the autonomous driving vehicle 840 moves to allow the passenger present within the autonomous driving vehicle 840 to get out corresponds to a second destination. That is, the second destination refers to a point from which the subscriber is to get out from the autonomous driving vehicle 840.

In some cases, the autonomous driving vehicle 840 may not be allowed to enter a point designated by a passenger due to legal limitations or may not be parked or halted at a point designated by a passenger due to a traffic amount, legal limitations or due to occupancy by other vehicle. Since the autonomous driving vehicle 840 does not have a driver, an accurate point at which the passenger and the autonomous driving vehicle 840 are to meet within a predetermined time should be determined.

The server 820 can set the first destination based on a location of the passenger terminal 810, a type and a location of the autonomous driving vehicle 840, driving information received from the autonomous driving vehicle 840, and legal limitations set on a road. When the first destination is set, the server 820 can transmit the first destination to the passenger terminal 810 and/or the autonomous driving vehicle 840.

When the first destination is received, the passenger terminal 810 can display a location of the passenger terminal 810 and the first destination on the map (S840). For example, a location of the autonomous driving vehicle 840, a direction in which the vehicle approaches the first destination, and an estimated time of arrival can be displayed on the passenger terminal 810.

The subscriber can designate a seat on which he or she is to sit using the passenger terminal 810, and designate ON/OFF of a hot wire of the corresponding seat, and an indoor temperature within the vehicle. When the number of people to get in is in plurality, seats of the passengers may be respectively designated.

The autonomous driving vehicle 840 can adjust an indoor temperature of the vehicle in consideration of an actual internal temperature of the vehicle, an estimated time of arrival, and the like, such that the designated indoor temperature is reached when the passenger arrives at the first destination.

In addition, when the first destination is received, the passenger terminal 810 can provide a digital key for unlocking a door of the autonomous driving vehicle 840. The subscriber can unlock the door of the autonomous driving vehicle 840 using the digital key provided in the passenger terminal 810.

In addition, the passenger terminal 810 can provide authentication for authenticating the subscriber, as well as the digital key. For example, as illustrated in FIG. 9, in order to authenticate the subscriber, a profile photo 930 registered in the server 810, a barcode 940 issued by the server 810, a password, and the like, can be displayed on the passenger terminal 810.

The subscriber can input a barcode displayed on the passenger terminal 810 by a barcode scanner provided in the autonomous driving vehicle 840 to perform authentication on the subscriber. When authentication of the subscriber is completed, the autonomous driving vehicle 840 can switch a locked door to a released state, or can start autonomous driving to the second destination.

Referring back to FIG. 8, when the first destination is received, the autonomous driving vehicle 840 performs autonomous driving to the first destination (S850). As autonomous driving starts, the autonomous driving vehicle 840 periodically or aperiodically transmits driving information including at least one of a location of the autonomous driving vehicle 840 and an estimated time of arrival to the server 820, and the server 820 transmits the received driving information to the passenger terminal 810.

When the autonomous driving vehicle 840 arrives at the first destination, the autonomous driving vehicle 840 parks at the first destination and waits for getting in (S860). In this instance, the autonomous driving vehicle 840 can transmit "arrival completion" to the passenger terminal 810 and/or the server 820.

Here, parking refers to switching from the autonomous driving vehicle 840 moving to a stop state. This is because a passenger is allowed to get in only when the autonomous driving vehicle 840 is stopped.

When the arrival at the first destination is scheduled to be within a predetermined time or when parking at the first destination is completed, the autonomous driving vehicle 840 can output "get-in guiding information" for guiding the subscriber to get in in various manners.

Figure 10:
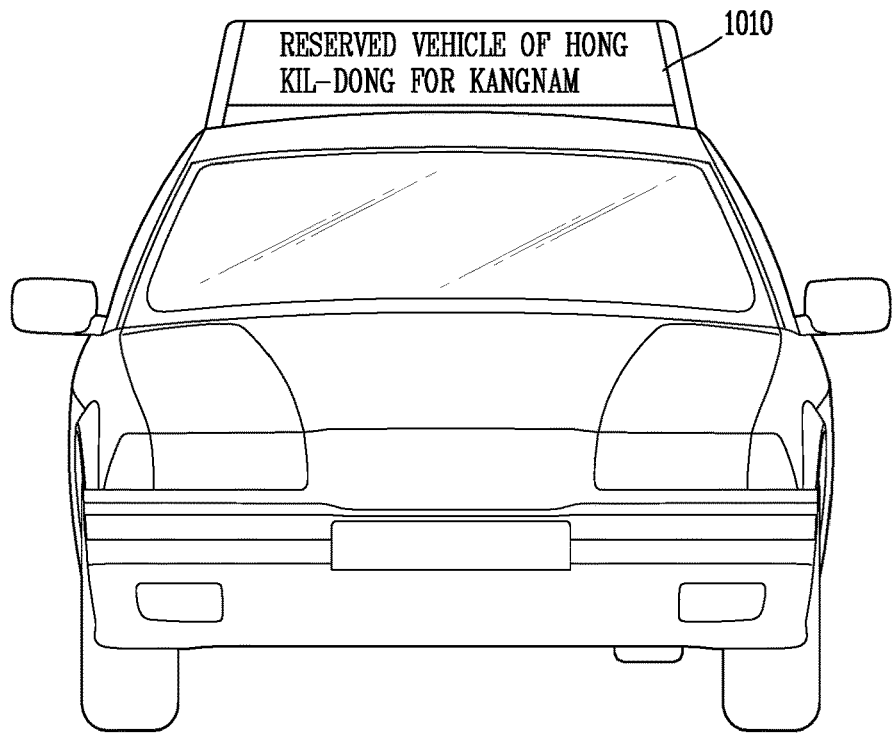
FIG. 10 is a diagram illustrating an example of a display device provided in an autonomous driving vehicle.

For example, as illustrated in FIG. 10, the autonomous driving vehicle 840 may have a display device 1010. The display device 1010 may be configured such that a third party located outside the vehicle to observe information displayed thereon. In addition, the get-in or entry guiding information may also be output to outside of the vehicle through a sound output unit provided in the autonomous driving vehicle 840.

The get-in or entry guiding information may include at least one of a name, an ID, a reservation number, and a destination of the subscriber, and an identification message set by the subscriber. The subscriber can quickly check (or view) the autonomous driving vehicle 840 allocated to the subscriber using the get-in guiding information output from the autonomous driving vehicle 840. Also, a third party' (not the subscriber's) getting in the autonomous driving vehicle 840 can be prevented in advance.

Also, when the autonomous driving vehicle 840 is stopped at the first destination, the autonomous driving vehicle 840 can move before a passenger gets in. For example, when a legally permitted stop available time has lapsed, when a signal has been changed, or when a space for a different vehicle to move is required, the autonomous driving vehicle 840 can move before a passenger gets in.

When the autonomous driving vehicle 840 is to move from the first destination before a passenger gets in, the autonomous driving vehicle 840 can change the first destination at which the autonomous driving vehicle 840 has been previously arranged to meet the passenger. That is, the autonomous driving vehicle 840 can search for a new destination and change the first destination to the searched new destination.

Further, the autonomous driving vehicle 840 can perform autonomous driving to the changed first destination and may be stopped in the changed first destination to wait for the passenger. The changed first destination can be transmitted to the server 820 and/or the passenger terminal 810, and in this instance, the changed first destination can be output in at least one manner.

Referring back to FIG. 8, the autonomous driving vehicle 840 can start autonomous driving to the second destination or maintain the parked state according to whether autonomous driving conditions to be fulfilled by the passenger are met (S870). The autonomous driving vehicle 840 can sense that a person gets in using various sensors. In more detail, the autonomous driving vehicle 840 can sense a point in time at which a door is opened, as "get-in start" and sense a point in time at which the door is closed, as "get-in completion"." Also, the autonomous driving vehicle 840 can sense the total number of passengers present in the vehicle or positions of the passengers within the vehicle using an internal camera imaging the interior of the vehicle and a pressure sensor provided in each seat.

Further, the autonomous driving vehicle 840 determines whether driving conditions to be fulfilled by the passenger are met based on "get-in completion"." When the autonomous driving conditions are met, autonomous driving to the second destination starts, whereas when the autonomous driving conditions are not met, autonomous driving to the second destination does not start. In another words, the autonomous driving vehicle 840 maintains the parked state in the first destination until the autonomous driving conditions are met.

The autonomous driving vehicle 840 searches for every passenger present in the vehicle and determines whether each of the searched passengers meets the autonomous driving conditions. When one or more passengers do not satisfy the autonomous driving conditions, the autonomous driving vehicle 840 does not perform autonomous driving to the second destination.

If a driver is present, the driver can check whether all the passengers present in the vehicle are wearing their seat belt, and will not start driving until they wear their seat belt. However, since a driver is not present in the autonomous driving vehicle 840, the autonomous driving vehicle 840 senses an abnormal situation using various sensors and may not start driving until an abnormal situation turns to a normal situation.

The autonomous driving conditions to be fulfilled by the passenger(s) may be varied according to one or more criteria, such as an age of the passenger, a type of a seat on which the passenger sits, whether the passenger has a driver's license, or other criteria. For example, autonomous driving conditions to be fulfilled by the passenger can be action guidelines for the passenger to follow. This may include measures to be taken for the sake of the passenger's safety.

As an example, when the passenger sits in the vehicle, the passenger can be required to wear a seat belt and completely close the vehicle door. As another example, a child can be prohibited from sitting in a front seat and instead be required to sit in a back seat or in a car seat and wear a seat belt. In such scenarios, autonomous driving to the second destination may not be started until all passengers present in the autonomous driving vehicle satisfy such requirements.

As yet another example, only a person who has a driver's license may be allowed to sit in the driver's seat, and a person who does not have a driver's license or a person who is not verified to have a driver's license may not be allowed to sit in the driver's seat. In such scenarios, the vehicle 840 can prevent a child or other unauthorized person from sitting in the driver's license and operating the vehicle 840. For example, when a passenger who is not verified to have a driver's license sits in the driver's seat of the autonomous driving vehicle 840, autonomous driving to the second destination can be limited and a parked state thereof can be held.

As a further example, before starting autonomous driving, the passenger can be required to view a video, such as a safety video including an action to be taken during emergency situations of the autonomous driving vehicle 840, or may be informed and guided about an "emergency stop switch" for terminating autonomous driving.

As another example, the autonomous driving conditions to be fulfilled by the passenger can be contractual conditions based on which the autonomous driving taxi service as reserved is to be provided. This may be an action for providing the autonomous driving taxi service as reserved. In such scenarios, the conditions may include, for example, that the subscriber and the actual passenger be identical, and/or that the number of people reserved for use of the vehicle and the number of people who actually get in the vehicle be identical. In some implementations, autonomous driving to the second destination may not be started until these conditions are met, for example until it is verified that the subscriber who has reserved autonomous driving to the second destination and the actual passenger of the autonomous driving vehicle 840 are matched. As such, the system can help prevent a third party unrelated to the reservation from illegally using the autonomous driving vehicle 840.

As yet another example, the requirement may include that the passenger should not put a load in the vehicle 840 that is heavier than a threshold value, or that the passenger should not eat or have prohibited such as cigarettes, drugs, alcohol, and the like in the vehicle 840. Also, when an alcohol level of a passenger is higher than a threshold value, the passenger can be limited from using the autonomous driving vehicle.

In some autonomous driving vehicles, preventing a collision with an object is enhanced by controlling driving and/or stopping of the vehicle based on objects positioned outside the vehicle. Taking a step further, the autonomous driving vehicle 840 controls driving and/or stopping of the vehicle 840 based on one or more passengers that are present within the vehicle. As such, in some scenarios, the vehicle 840 can provide an autonomous driving taxi service that improves safe get-in/get-out (entry and exit) of passengers, and increases satisfaction of the vehicle owner.

Furthermore, the vehicle 840 can verify one or more requirements to be checked for a driver in order to start driving, for example by using sensors provided in the autonomous driving vehicle 740 and checking those requirements. As such, since autonomous driving to a destination does not start until autonomous driving conditions to be fulfilled by a passenger are satisfied, safety of the passenger is improved and autonomous driving may be performed with requirements of regulations met.

If the passenger does not get in the autonomous driving vehicle within a predetermined time, for example starting from a point in time at which the autonomous driving vehicle 840 arrives at the first destination, then the autonomous driving vehicle 840 can transmit information, such as a "reservation cancel request," to the server 820. For example, a lapse of the predetermined time may indicate a no-show passenger, and thus, the autonomous driving vehicle 840 can cancel the reserved state and may be switched to a standby state for receiving a new reservation.

Figure 11:
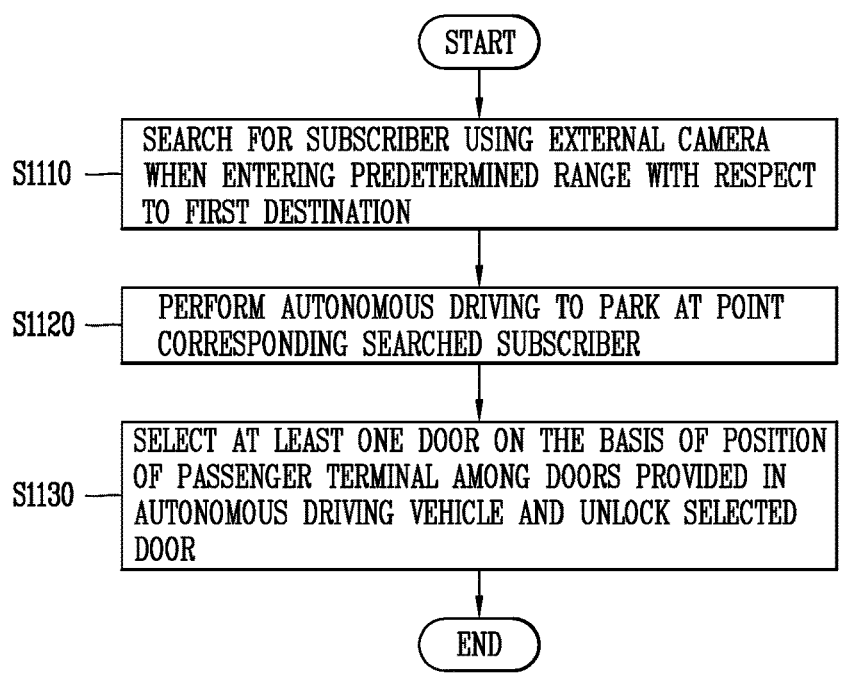
FIG. 11 is a flow chart illustrating an example of setting a destination of autonomous driving by an autonomous driving vehicle based on a location of a terminal.
Figure 12:
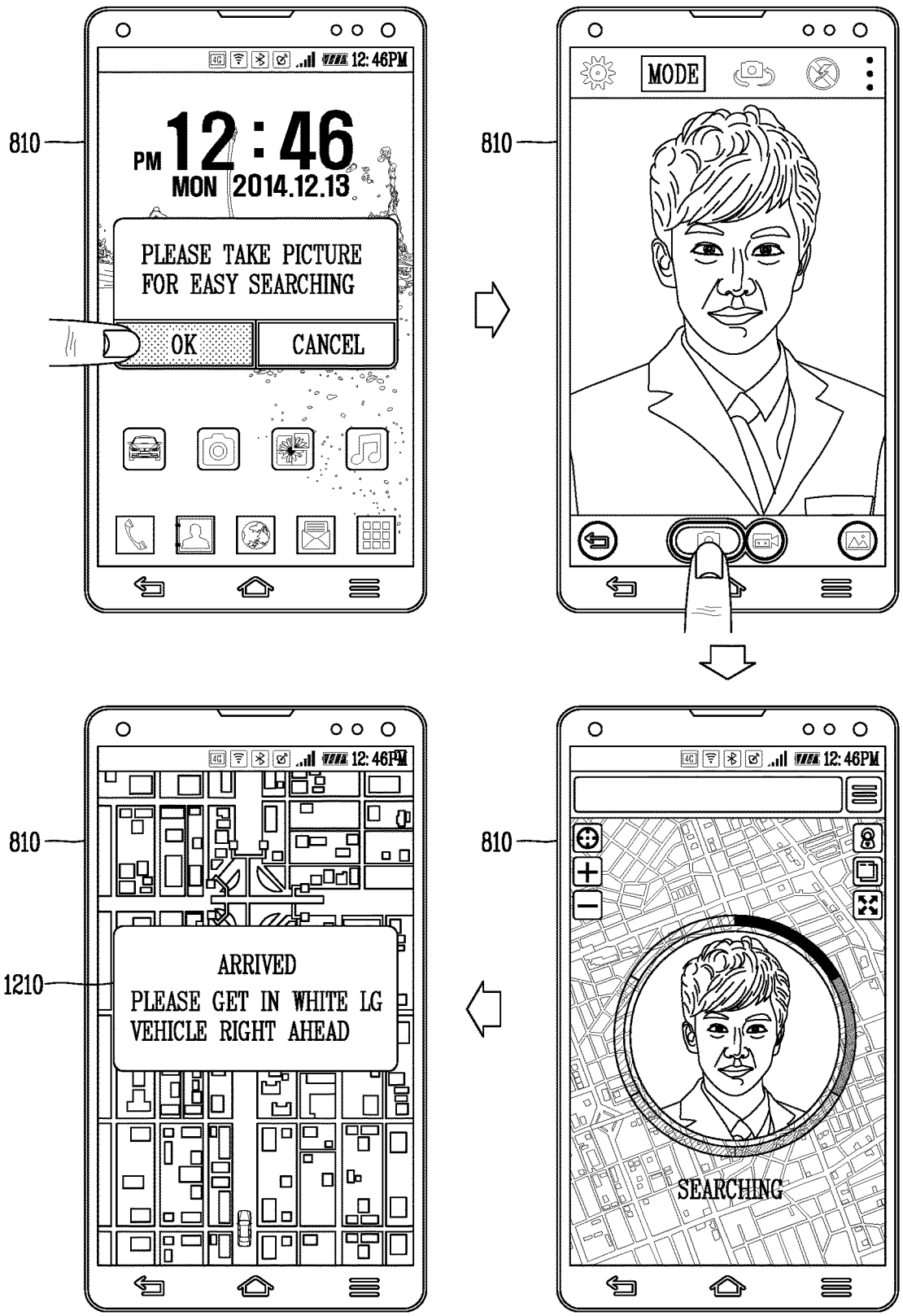
FIG. 12 is a diagram illustrating an example of an operation of a terminal determining a subscriber, such as a person who has reserved an autonomous driving vehicle.

Next, FIG. 11 is a flow chart illustrating a method for setting a destination of autonomous driving by an autonomous driving vehicle based on a location of a terminal, and FIG. 12 is a view illustrating an operation of a terminal to accurately search for a subscriber (i.e., a person who has reserved an autonomous driving vehicle).

When there is a driver, the driver can see his or her passenger with their eyes and move the vehicle to a point where the passenger can get in. However, for the autonomous driving vehicle 840 without a driver, it is required to prepare a method for the autonomous driving vehicle 840 to accurately move to a location of the subscriber and increase subscriber's convenience.

When the autonomous driving vehicle 840 enters a predetermined range with respect to the first destination, the autonomous driving vehicle 840 can search for a subscriber using an external camera (S1110). The predetermined range refers to a range in which a position of the passenger terminal 810 is searched for the subscriber using the external camera. Thus, the predetermined range may be varied according to a position of the passenger terminal 810 held by the subscriber and a position of the autonomous driving vehicle 840.

The autonomous driving vehicle 840 can receive a profile picture of the subscriber form the server 820 and/or the passenger terminal 810. The autonomous driving vehicle 840 can search for the subscriber from an image captured by the external camera using the received profile picture.

When there is no profile picture stored in the server 820, the server 820 can request the profile picture from the passenger terminal 810. For example, as illustrated in FIG. 12, the passenger terminal 810 can request the user to take a profile picture in response to the request from the server 820. Thereafter, when a profile picture is taken, the taken profile picture can be transmitted from the passenger terminal 810 to the server 820 and/or to the autonomous driving vehicle 840.

In some scenarios, the profile picture may include information identifying the subscriber, such as clothing worn by the subscriber, a hair style of the subscriber, a bag carried by the subscriber, and the like. Using such information, the autonomous driving vehicle 840 can more accurately search for the subscriber using the profile picture.

Thereafter, the autonomous driving vehicle 840 can perform autonomous driving to be stopped at a point corresponding to the searched subscriber (S1120). For example, the first destination at which the subscriber is to enter the autonomous driving vehicle 840 may be changed according to locations of the subscriber, for example in real time.

The autonomous driving vehicle 840 can determine a point at which the searched subscriber is to enter the vehicle, for example by mapping a map and GPS information to a captured image. As an example, the point at which the searched subscriber is to enter the vehicle 840 may be defined as a location at which the autonomous driving vehicle 840 can park and which is convenient for the subscriber to reach, for example at a minimum distance for the subscriber to walk to enter the autonomous driving vehicle 840. In some scenarios, the location at which the subscriber is to enter may exclude one or more geographic features.

For example, a road in which a vehicle is parked or halted, a road that the autonomous driving vehicle 840 is unable to enter, or a road in which a vehicle is prohibited from parking can be excluded from being the location at which the subscriber is to enter the autonomous driving vehicle 840. In this instance, since a point at the shortest distance from the subscriber (e.g., a shortest distance for the subscribe to walk in order to reach the location at which to enter the vehicle 840) is set or reset as the first destination, the subscriber's convenience can be increased.

The autonomous driving vehicle 840 autonomous driving vehicle 840 changes the first destination collectively in consideration of one or more types of information transmitted from the passenger terminal 810, such as GPS information, V2X information, and the like, and also based on image(s) captured by the external camera.

When the first destination is changed, the autonomous driving vehicle 840 can transmit the changed first destination to the server 820 and/or the passenger terminal 810. The subscriber can check the changed first destination 1210 using his passenger terminal 810.

Referring back to FIG. 11, after parked at the first destination, the autonomous driving vehicle 840 can select at least one door based on a location of the passenger terminal 810, from among doors provided in the autonomous driving vehicle 840, and unlock the selected door (S1130). When the door of the autonomous driving vehicle 840 is unlocked, a third party unrelated to reservation may get in the autonomous driving vehicle 840. Thus, in order to prevent this problem, the autonomous driving vehicle 840 can target only the subscriber and controls locking of the door such that only the targeted subscriber gets therein.

For example, when the subscriber approaches the autonomous driving vehicle 840 from the rear right side, the autonomous driving vehicle 840 can unlock only the right door of the back seat and keep the other doors locked. In another example, when the subscriber designates a seat on which he is to sit, when the passenger terminal 810 enters a predetermined range from the parked point, a door corresponding to the designated seat can be unlocked and a door not corresponding to the designated seat may remain locked.

Figure 13:
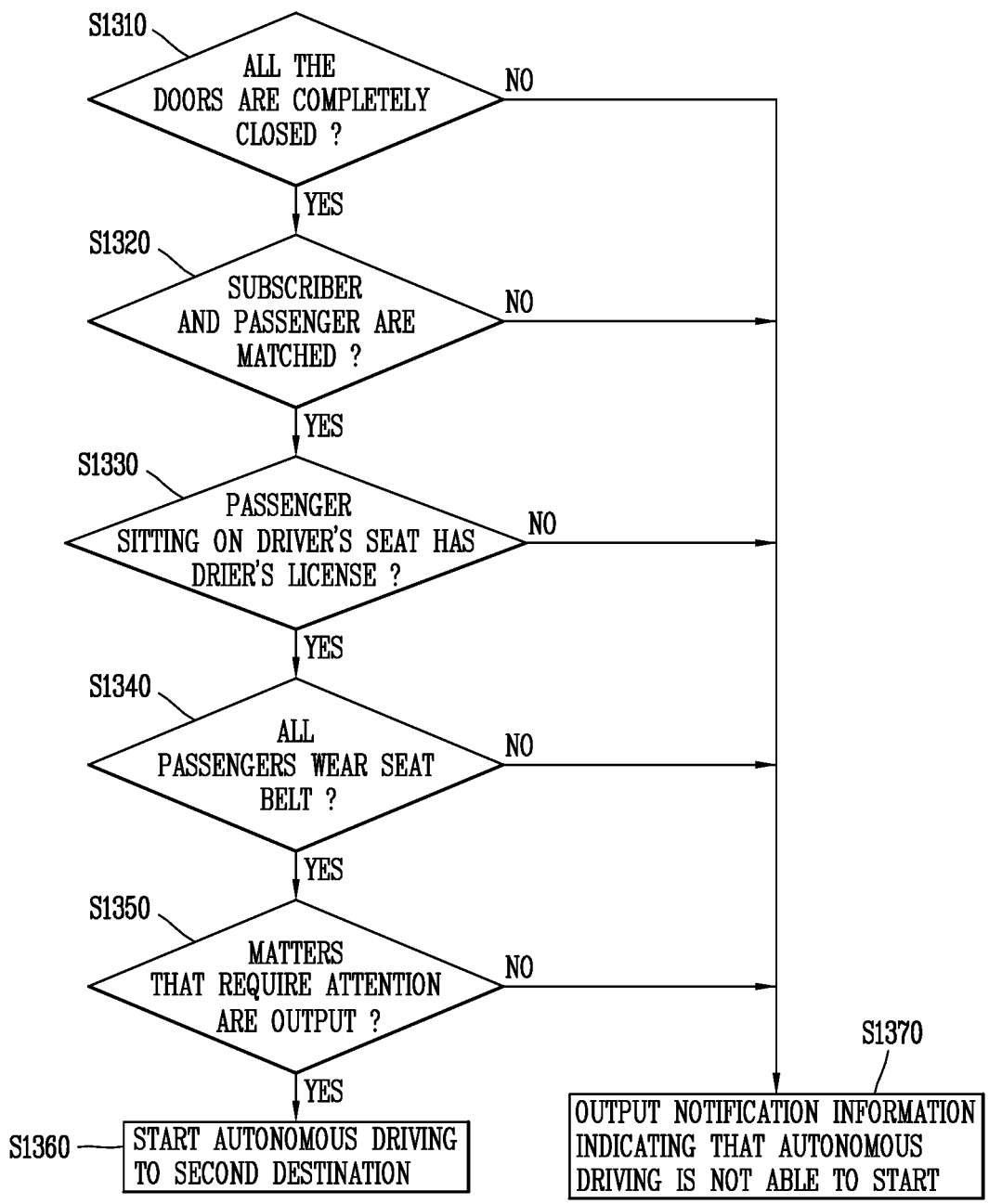
FIG. 13 is a flow chart illustrating an example of controlling an autonomous driving vehicle according to the present disclosure.
Figure 14:
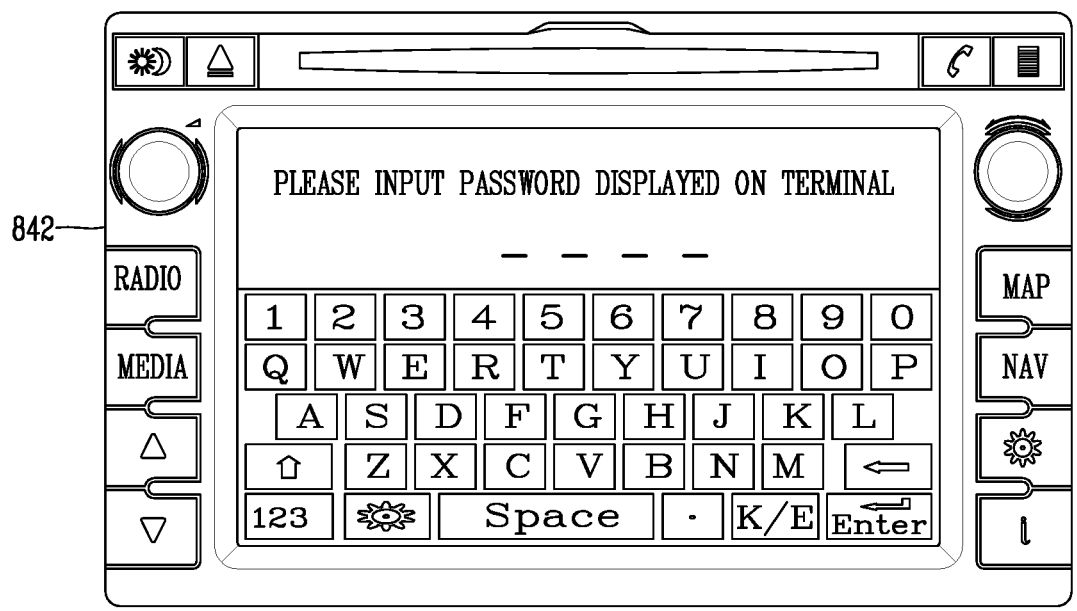
FIG. 14 is a diagram illustrating an example of verifying that a passenger who has entered the vehicle matches a subscriber who has reserved an autonomous driving vehicle for the vehicle.
Figure 14:
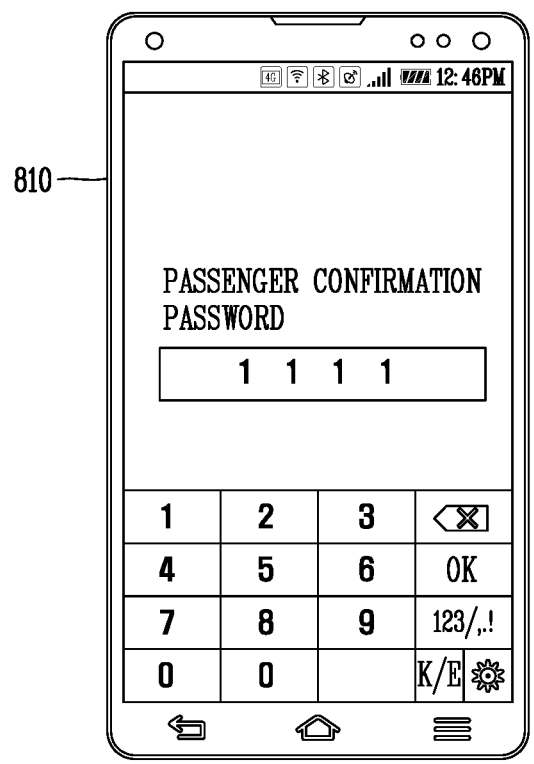

A method for controlling an autonomous driving vehicle when the subscriber gets in the autonomous driving vehicle 840 at the first destination will be described in detail. In particular, FIG. 13 is a flow chart illustrating a method for controlling an autonomous driving vehicle according to the present disclosure, and FIG. 14 is a view illustrating an implementation for ascertaining a subscriber and a passenger.

When the subscriber completely get in the autonomous driving vehicle 840, the autonomous driving vehicle 840 determines whether autonomous driving conditions to be fulfilled by the passenger are met. According to determination results, the autonomous driving vehicle 840 can start autonomous driving to the second destination (S1360) or can output notification information indicating that autonomous driving cannot start (S1370).

When at least one of the autonomous driving conditions to be fulfilled by the passenger is not met, the autonomous driving vehicle 840 can output notification information indicating that autonomous driving cannot start. That is, when the autonomous driving conditions are not met, the autonomous driving vehicle 840 can output the notification information indicating that autonomous driving toward the second destination cannot start until when the autonomous driving conditions are met.

The autonomous driving vehicle 840 may explain the reason why it does not start to the passenger(s) and request cooperation such that autonomous driving to the second destination can start promptly. Also, the notification information may include action guidelines that the passenger is to follow in order to start autonomous driving to the second destination. Like a passenger who is in an airplane is to be well-informed of action guidelines related to safety, the passenger using the autonomous driving vehicle 840 is required to be well-informed of action guidelines related to safety. For example, a method for taking measures in the occurrence of an accident, an emergency vehicle stop method, a method for switching from autonomous driving to manual driving, a method for wearing a seat belt, an emergency contact number, and the like, may be included as action guidelines in the notification information and output.

The notification information can be output through at least one of a vehicle output unit provided in the autonomous driving vehicle 840 or a terminal output unit provided in the passenger terminal 810. The autonomous driving vehicle 840 can transmit the generated notification information to the passenger terminal 810 through a wireless communication unit such that the notification information can be output from the passenger terminal 810. The notification information can be output in at least one of a visual, audible, and tactile manners. When all the autonomous driving conditions are met, the autonomous driving vehicle 840 can stop outputting the notification information and starts autonomous driving to the second destination.

Hereinafter, autonomous driving conditions required for the autonomous driving vehicle 840 to start toward the second destination will be described in detail. It is assumed that the autonomous driving vehicle 840 has various sensors to check autonomous driving conditions. After the passenger gets in, the autonomous driving vehicle 840 can determine whether all the doors thereof are completely closed (S1310).

If at least one of the doors provided in the vehicle is in an open state, without being completely closed, the autonomous driving vehicle 840 and/or the passenger terminal 810 can output notification information indicating a position of the opened door. The autonomous driving vehicle 840 can determine whether the passenger who has entered the vehicle is matched to the subscriber (S1320). In addition, the autonomous driving vehicle 840 can output notification information indicating an authentication method for checking matching.

As an example, the autonomous driving vehicle 840 may further include an internal camera imaging the inside of the vehicle and may capture an internal image using the internal camera. Thereafter, the autonomous driving vehicle 840 extracts the passenger from the internal image and determines whether the extracted passenger is matched to the subscriber included in the profile image.

When the matching using the internal image is successful, the autonomous driving vehicle 840 deletes the profile picture. This may be implemented, for example, to prevent personal information from being stored in the autonomous driving vehicle 840 or leaked to a third party.

When the matching using the internal image fails or is not available, the autonomous driving vehicle 840 can determine whether the passenger present in the autonomous driving vehicle 840 is matched to the subscriber using another authentication technique. In addition, such authentication techniques may be used in addition or as an alternative to using an image.

For example, as illustrated in FIG. 14, another authentication technique may be inputting a password or passcode generated in the passenger terminal 810 and/or the server 840 to the autonomous driving vehicle 840. As a particular example, the passenger terminal 810 can display a password to be input to the autonomous driving vehicle 840 and the autonomous driving vehicle 840 can output a locked screen formed to receive a password on a display device 842. The passenger can input the password displayed on the passenger terminal 810 to the autonomous driving vehicle 840 to authenticate being the subscriber.

As another example, the subscriber can be authenticated in various manners such as fingerprint recognition, iris recognition, authentication using a barcode displayed on the passenger terminal 810, tagging (e.g., via NFC tags), and the like, and such authentication techniques (fingerprint, barcode, etc.) may be stored in the server 820 and managed.

The autonomous driving vehicle 840 may also have a driver's seat, and various electric/electronic components related to controlling of the vehicle may be provided in the driver's seat. Although autonomous driving is performed, when a user input is input to a specific electric/electronic component, a corresponding function can be executed. For example, when a brake is pressed during autonomous driving, the autonomous driving vehicle 840 can be braked in spite of autonomous driving.

Thus, in some cases, a passenger who has a driver's license may need to sit on the driver's seat. When a passenger sits on the driver's seat, the autonomous driving vehicle 840 according to the present disclosure can determine whether the passenger has a driver's license (S1330). For example, the autonomous driving vehicle 840 can determine whether the passenger sitting on the driver's seat has a driver's license based on passenger information received from the server 840.

In another example, the autonomous driving vehicle 840 can request the passenger sitting on the driver's seat to verify a driver's license. In this instance, the person sitting on the driver's seat can capture his driver's license using the internal camera of the vehicle or input a verification number verifying his driver's license.

When the driver's license is imaged, the autonomous driving vehicle 840 can transmit the captured image to the server 820, and the server 820 can determine whether the driver's license is valid using the captured image. When the driver's license is valid, it is determined that the corresponding condition is met. In contrast, when the driver's license is not valid, the autonomous driving vehicle 840 can output guide information guiding the person sitting on the driver's seat to sit on another seat. Until the person sitting on the driver's seat sits on another seat, autonomous driving toward the second destination does not start.

The autonomous driving vehicle 840 can determine whether all the passengers have worn a seat belt (S1340). When even at least one passenger does not wear the seat belt, autonomous driving to the second destination is limited. However, a passenger who does not legally need to wear a seat belt, such as a pregnant woman, and so one, is considered an exception of the autonomous driving conditions. For example, when a passenger verifies that she is a pregnant woman using her terminal and/or the autonomous driving vehicle 840, notification information is not output even though she does not wear a seat belt, and autonomous driving to the second destination is not limited.

The autonomous driving vehicle 840 can output matters that require attention, and determine whether output thereof has been completed (S1350). For example, matters that require attention during autonomous driving may be a video having a predetermined play time. Before starting autonomous driving, the autonomous driving vehicle 840 may play the video, and when playing the video is completed, the autonomous driving vehicle 840 can start autonomous driving to the second destination. When playing the video is stopped or the video is not played, autonomous driving to the second destination is limited and the autonomous driving vehicle 840 is held in a parked state. In addition, various autonomous driving conditions for the autonomous driving vehicle to start autonomous driving may be set.

The autonomous driving vehicle 840 may have a memory, and the memory can store autonomous driving conditions for starting autonomous driving. One or more of the autonomous driving conditions stored in the memory may be updated or deleted through the server 820 or a new autonomous driving condition may be added.

When all the autonomous driving conditions are met, the autonomous driving vehicle 840 starts autonomous driving toward the second destination. Here, the autonomous driving vehicle 840 can calculate cost for autonomous driving and display the calculated cost on a display device provided in the vehicle. In other words, since a use fare of the autonomous driving vehicle 840 is calculated from a point in time at which autonomous driving starts, a user can pay cost for a portion of using a service.

The cost is calculated by an algorithm stored in the server 820 and/or the autonomous driving vehicle 840. In addition, the cost may be varied depending on at least one of characteristics of the vehicle, the number of passengers, a member class of the subscriber, a time required for moving from a departure point to a destination, a movement distance, and a difference between a weight before passengers get on the vehicle and a weight of the vehicle after passengers get on.

The autonomous driving vehicle 840 calculates a use fare to a point in time at which all the passengers completely get out. For example, even though the autonomous driving vehicle 840 arrives at the second destination, the use fare may be added until passengers completely get out. This is to make the passengers get out quickly.

Figure 15:
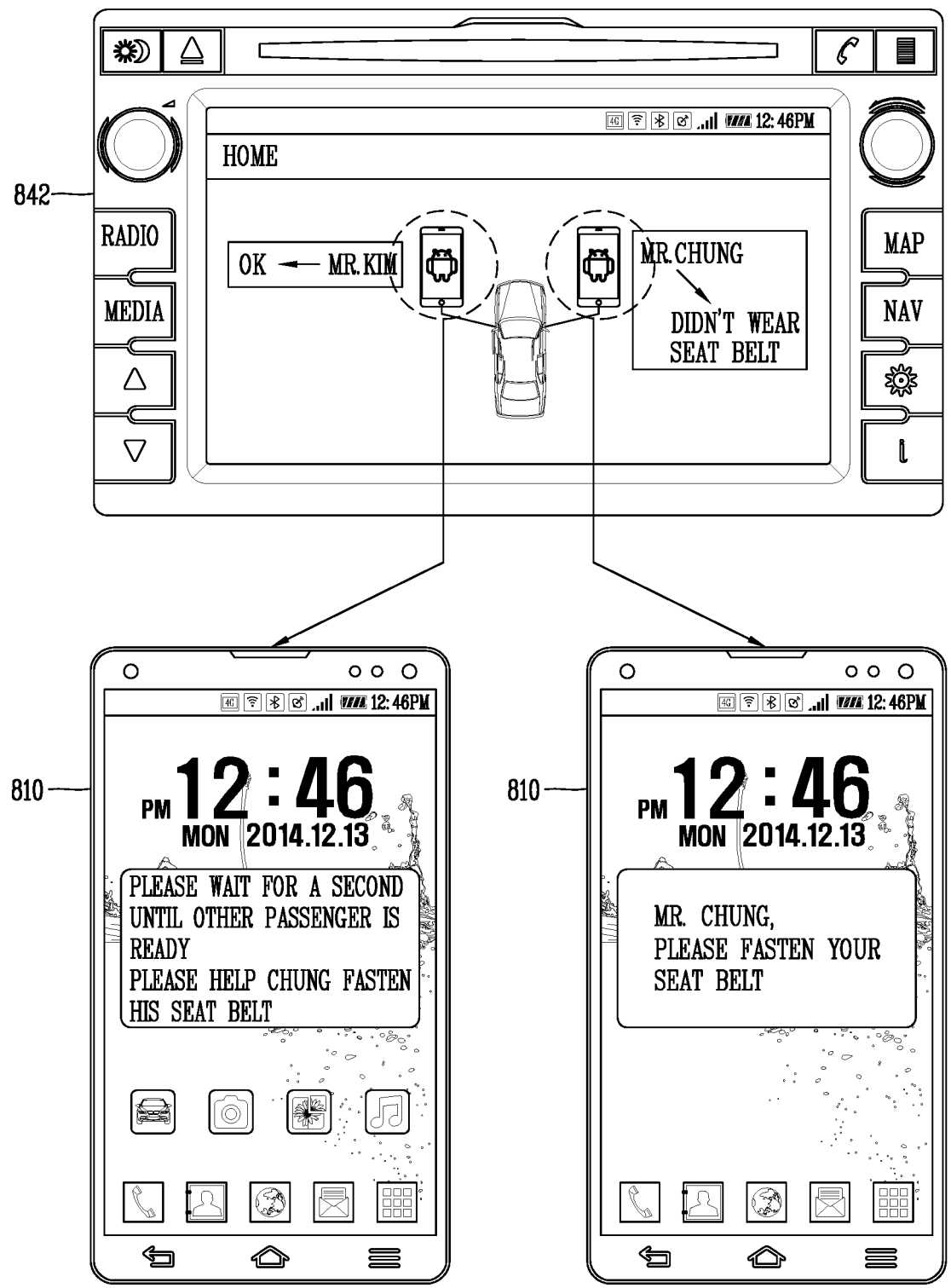
FIG. 15 is a diagram illustrating an example of an operation of a terminal and an operation of an autonomous driving vehicle when a passenger does not satisfy autonomous driving conditions.

Next, FIG. 15 is a view illustrating an operation of a terminal and an operation of an autonomous driving vehicle when autonomous driving conditions to be fulfilled by a passenger are not met. The autonomous driving vehicle 840 selects at least one passenger who does not meet the autonomous driving conditions, and outputs notification information including information regarding the selected passenger and action guidelines to be followed by the selected passenger.

For example, when a first passenger does not meet a first condition, first action guidelines for satisfying the first condition can be output as notification information on a terminal of the first passenger. Here, when a second passenger does not satisfy a second condition, second action guidelines for satisfying the second condition can be output on a terminal of the second passenger. The first action guidelines for the first passenger and the second action guidelines for the second passenger can be simultaneously or sequentially output on the autonomous driving vehicle 840.

When Mr. Chung sits on a passenger's seat and Mr. Kim sits on a driver's seat will be described as an example. When Chung sitting on the passenger's seat does not wear a seat belt, notification information such as "Mr. Chung, please fasten your seat belt" can be output to a terminal 810*b* of Chung and/or the autonomous driving vehicle 840. Although Kim meets the autonomous driving conditions, notification information such as "Please help Chung fasten his seat belt" and/or "Please wait for a second until another passenger is ready" can be output on a terminal 810*a* of Kim and/or the autonomous driving vehicle 840.

Since an autonomous driving condition to be satisfied is output to a terminal of a passenger who is to take a corresponding action, the passenger can accurately recognize an action to be taken by himself. While autonomous driving toward the second destination is performed, the autonomous driving vehicle 840 can change the second destination based on a request from the passenger.

Figure 16:
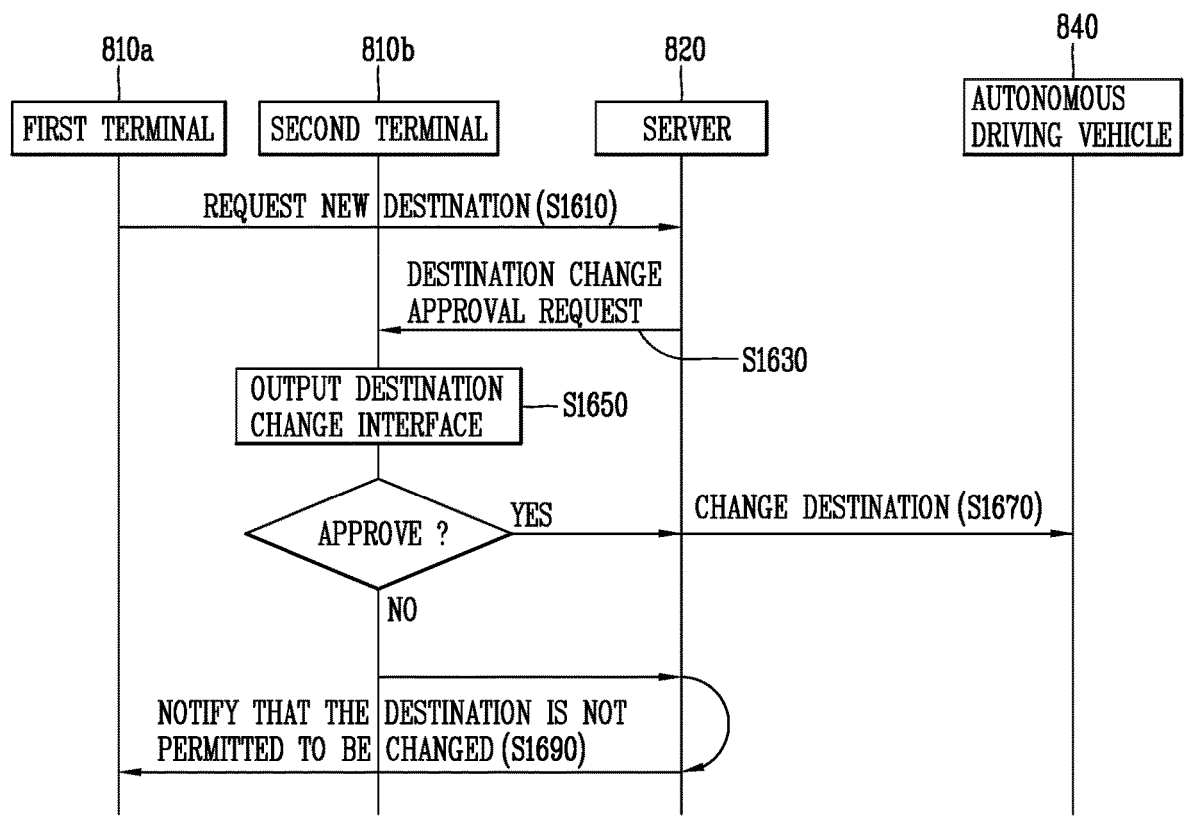
FIG. 16 is a flow chart illustrating an example of changing a destination during autonomous driving, based on a user input.

Next, FIG. 16 is a flow chart illustrating a process of changing a destination during autonomous driving based on a user input. For the purposes of description, when first and second passengers are present in the autonomous driving vehicle 840 will be described as an example. The first passenger holds a first passenger terminal 810*a* and the second passenger holds a second passenger terminal 810*b*.

The first passenger can request a new destination of autonomous driving using the first passenger terminal 810*a* (S1610). For example, when an execution screen of an application for providing the autonomous driving taxi service is displayed on the first passenger terminal 810*a*, the first passenger can request a new destination using a destination change menu included in the execution screen.

If another passenger is not present in the autonomous driving vehicle 840, the server 820 can change the second destination of the autonomous driving vehicle 840 to a new destination based on the destination change request from the first passenger terminal 810. If, however, another passenger is present in the vehicle, the server 820 can change the second destination of the autonomous driving vehicle 840 to a new destination with the consent of all the passengers.

In more detail, the server 820 transmits a destination change approval request to the second passenger terminal 810*b* (S1630). The second passenger terminal 810*b* outputs a destination change interface in response to the destination change approval request (S1650). When an approval is input to the second passenger terminal 810*b* within a predetermined time, the second passenger terminal 810*b* transmits a change approval to the server 820, and the server 820 commands the autonomous driving vehicle 840 to change a destination (S1670).

If, however, when an approval rejection is input to the second passenger terminal 810*b* or when an approval is not input with the predetermined time, the second passenger terminal 810*b* transmits change non-permission to the server 820, and the server 820 notifies the first passenger terminal 810*a* that the destination is not permitted to be changed (S1690).

Accordingly, the destination of the autonomous driving vehicle 840 can be changed with the consent of all the passengers. In addition, the second destination of the autonomous driving vehicle 840 may include a plurality of points. For example, the second destination may include a first point as a get-out point of the first passenger (i.e., a point at which the first passenger is to get out) and a second point as a get-out point of the second passenger.

The autonomous driving vehicle 840 can set any one of the first point and the second point as a stop and another as a final destination, in consideration of traffic, a movement distance, and the like. In this instance, the autonomous driving vehicle 840 and/or the server 820 can designate seats for the first passenger and the second passenger such that the first passenger who is to get out at a stop may get out quickly. For example, the autonomous driving vehicle 840 and/or the server 820 can designate a seat close to a sidewalk, among seats positioned in the same row, as a seat for the first passenger and a seat distant from the sidewalk, as a seat for the second passenger.

The autonomous driving vehicle 840 can change the second destination using a natural language. For example, when a passenger speaks like "Please let me get out 100 meters ahead from here", the second destination can be changed to the point available for parking 100 meters ahead. In another example, when a passenger speaks like "Please turn left at a next alley" the second destination can be changed according to the user's voice command.

If the autonomous vehicle 840 cannot park at a point requested by the passenger, or cannot move to the point requested by the passenger, then the autonomous driving vehicle 840 can output guide information guiding a corresponding reason. The autonomous driving vehicle 840 can monitor a vehicle state and/or a passenger state, while performing autonomous driving toward the second destination. When an event causing a vehicle state or a passenger state to be changed occurs according to a monitoring result, a function corresponding to the generated event can be executed.

Figure 17:
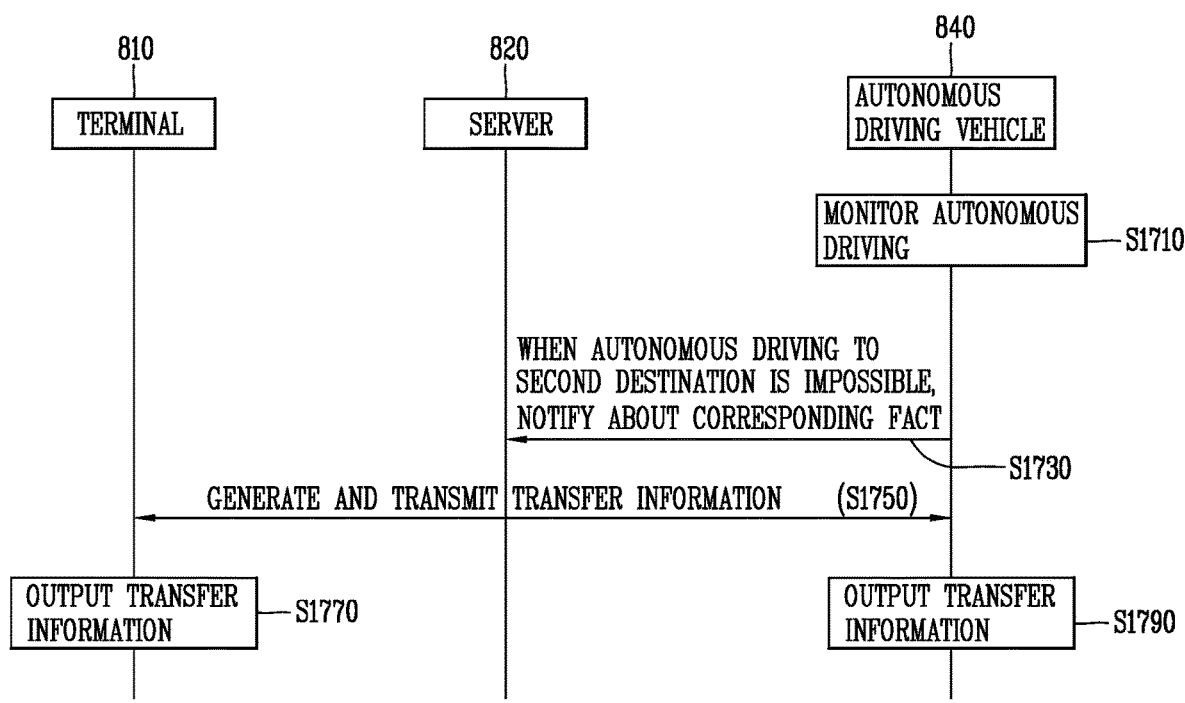
FIG. 17 is a flow chart illustrating an example of operating an autonomous driving system in a scenario in which autonomous driving is not available.
Figure 18:
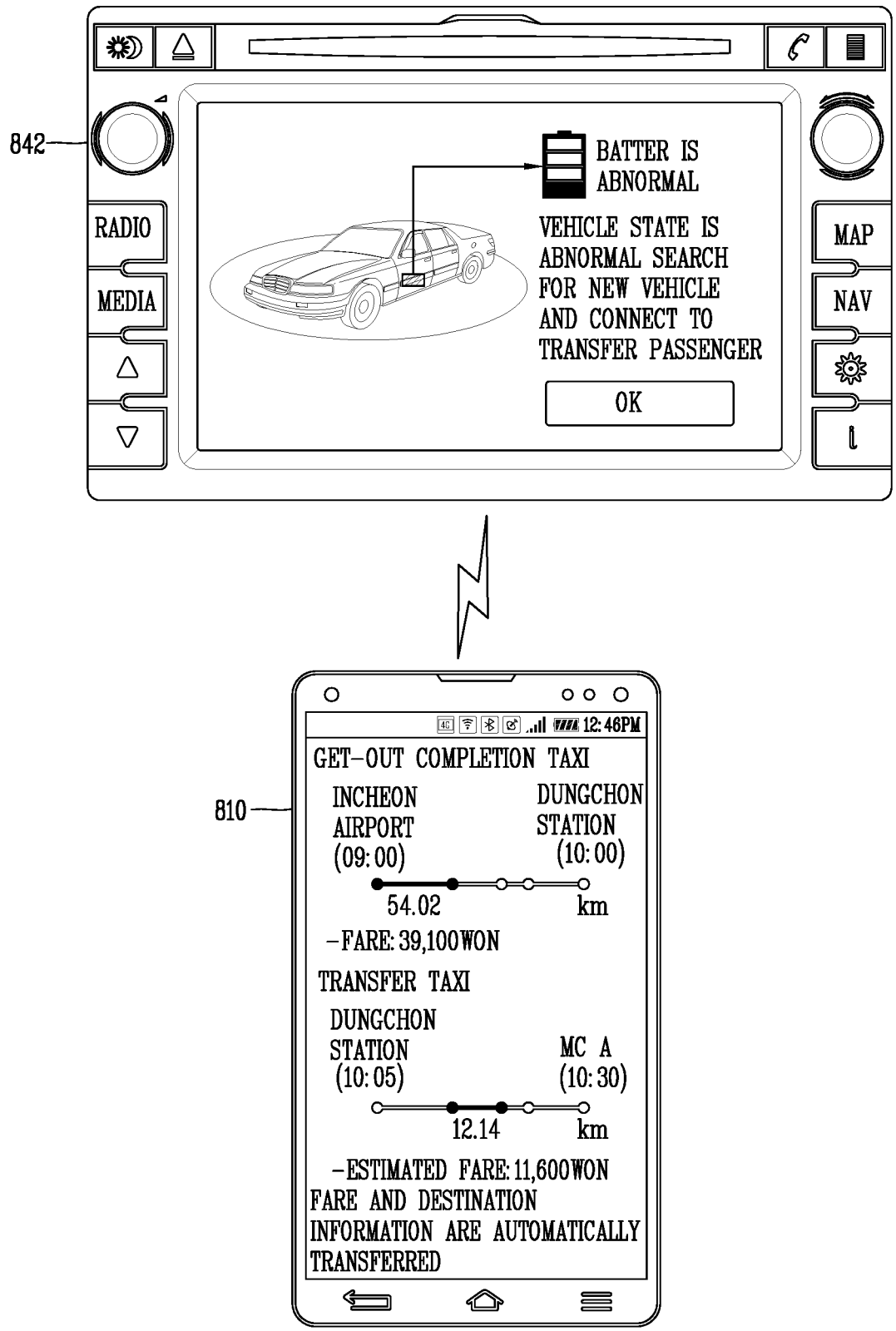
FIG. 18 is a diagram illustrating an example of transfer information output from a terminal and a mobile terminal in a scenario in which autonomous driving is not available.

First, when a vehicle state is changed will be described in detail. In particular, FIG. 17 is a flow chart illustrating an autonomous driving system when autonomous driving is not available, and FIG. 18 is a view illustrating transfer information output from a terminal and a mobile terminal when autonomous driving is not available.

The autonomous driving vehicle 840 monitors autonomous driving (S1710). The autonomous driving vehicle 840 determines whether a vehicle state reaches a predetermined state in which autonomous driving is not available or whether the predetermined state is due. In addition, the autonomous driving vehicle 840 can determine whether a passenger should be get out due to the change in the vehicle state.

When the vehicle state has been changed but a passenger is not required to get out, the autonomous driving vehicle 840 executes a function corresponding to the change in the vehicle state. For example, when the autonomous driving vehicle 840 is required to be refueled (charged) to reach the second destination, the autonomous driving vehicle 840 can set a gas station as a stop and may be refueled in the gas station. Cost for a movement time and a movement distance incurred due to refueling is excluded from the use fare and calculation of use fare may be temporarily stopped.

When a passenger is required to get out due to the change in the vehicle state, the autonomous driving vehicle 840 can notify the server 820 about unavailability of autonomous driving and request a transfer operation for the passenger to perform a transfer (S1730). For example, when a major component such as a tire, or the like, has a fault or a battery of an electric vehicle is abnormal, a state of the vehicle can reach a predetermined state in which the vehicle cannot perform autonomous driving, or the predetermined state may be due to come. In another example, even when an accident occurs, the passenger(s) are required to get out to deal with the accident.

In this instance, the autonomous driving tax service according to the present disclosure can provide a transfer operation to allow the passenger to safely move to the second destination. In more detail, in response to the autonomous driving unavailability, the server 820 can search for another autonomous driving vehicle that can rapidly move to the point where the autonomous driving vehicle 840 is parked or where the autonomous driving vehicle 840 is scheduled to be parked.

The server 820 can transmit a transfer command to the searched autonomous driving vehicle, and generate and transmit transfer information to the passenger terminal 810 and/or the autonomous driving vehicle 840 (S1750). The other autonomous driving vehicle can move to the point at which the passenger can get therein, as a transfer vehicle, according to the command from the server 820, take on the passenger, and subsequently move to the second destination.

When the autonomous driving vehicle 840 informs the server 820 about the autonomous driving unavailability, the autonomous driving vehicle 840 can park in a safest location within a movement-available range and output transfer information guiding a means of transportation to move to the second destination from the parked point. The transfer information includes, for example, at least one of the reason for transfer, a point where the autonomous driving vehicle 840 is parked or is to be parked, information regarding another vehicle assisting the autonomous driving vehicle 840 in moving to the second destination, a location of the other vehicle, or a time required for the other vehicle to reach the parked point.

Based on the parked point, the autonomous driving vehicle 840 can guide the passenger to get out or output guide information to allow the passenger to remain in the vehicle. For example, when the parked point is the shoulder involving a possibility of a secondary accident, the autonomous driving vehicle 840 can output guide information to guide the passenger to get out for the purpose of the passenger's safety. Or, the parked point is a safe parking lot without a possibility of a secondary accident, the autonomous driving vehicle 840 can output guide information guiding the passenger to remain in the vehicle for the convenience of the passenger.

The transfer information can be displayed on the autonomous driving vehicle 840 (S1790) and/or the passenger terminal 810 (S1770). For example, as illustrated in FIG. 18, the transfer information can be transferred form the server to the passenger terminal 810 so as to be output from the passenger terminal 810. When a state of the autonomous driving vehicle 840 reaches the predetermined state in which autonomous driving is not available or the predetermined state is due to come, calculation of the use fare of the autonomous driving vehicle 840 is temporarily stopped.

In the case of transfer, the passenger can use two or more transportations to move to the destination. For example, the passenger can move from a first point to a second point by a first autonomous driving vehicle and move from the second point to a third point by a second autonomous driving vehicle. The passenger terminal 810 can discriminately display movement information by the first autonomous driving vehicle and movement information by the second autonomous driving vehicle.

Here, the movement information may include at least one of a departure point and an arrival point of each autonomous driving vehicle, a starting time and an arrival time of each autonomous driving vehicle, a time required for movement, cost incurred in each autonomous driving vehicle, and a time required for transfer. Also, when transfer is performed, a use fare of the autonomous driving taxi service is automatically transferred from the first autonomous driving vehicle to the second autonomous driving vehicle. For example, when transfer is performed when a use fare incurred by the first autonomous driving vehicle is $10, a use fare of the second autonomous driving vehicle can be calculated from $10. That is, when the passenger gets in the second autonomous driving vehicle due to transfer, the use fare which has incurred in the first autonomous driving vehicle can be displayed on the second autonomous driving vehicle.

In some implementations, even when the passenger is changed, the autonomous driving vehicle 840 can execute a function corresponding to the change in the passenger state. A heartbeat, respiration, a body temperature, and the like, of the passenger are measured, and a function corresponding to the state of the passenger can be executed. For example, when the passenger has the fever, an air-conditioner may be actuated or a window may be opened in order to bring down the fever. In another example, when the passenger vomits, a window may be opened and the vehicle may be parked at a safe point. In another example, when the passenger has a sudden cardiac arrest, the destination may be changed to a closest hospital.

In some implementations, when the autonomous driving vehicle 840 cannot park in the second destination, the autonomous driving vehicle 840 can search for a third destination, start to perform automatic driving to the searched third destination, and output destination change information guiding the third destination.

Figure 19:
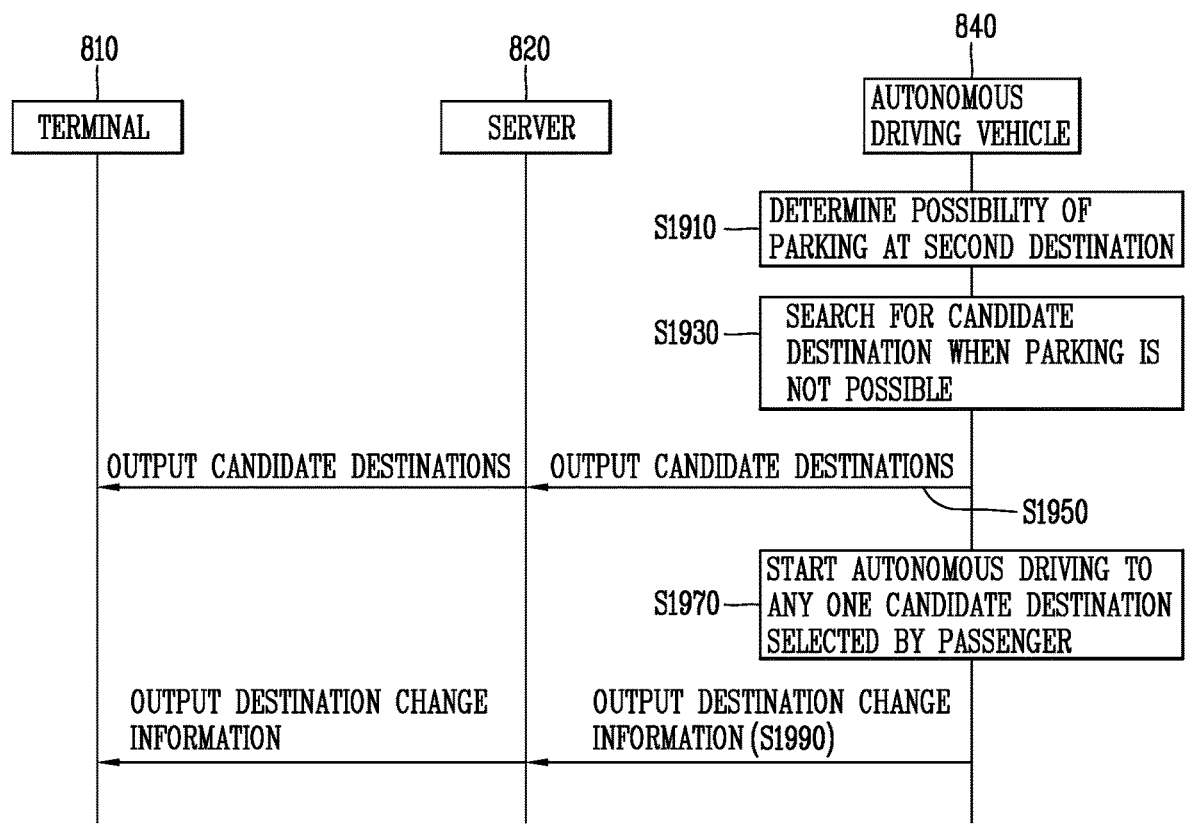
FIG. 19 is a flow chart illustrating an example of changing a destination of an autonomous driving vehicle without a user input.

Next, FIG. 19 is a flow chart illustrating a process of changing a destination of an autonomous driving vehicle even without a user input. The autonomous driving vehicle 840 can determine a possibility of parking in the second destination (S1910). For example, the autonomous driving vehicle 840 can determine that parking in the second destination is not available for various reasons, such as when parking is legally prohibited, when another vehicle is parked, or in the case of construction. Here, the autonomous driving vehicle 840 can determine a possibility of parking in the second destination using sensors such as an external camera configured to image the outside, a lidar, a radar, and the like.

When an autonomous parking operation is not available, the autonomous driving vehicle 840 can search for a candidate destination available for parking within a predetermined range with respect to the second destination (S1930). When one candidate destination is searched, the autonomous driving vehicle 840 can guide change of the destination and perform autonomous driving to the changed destination.

When a plurality of candidate destinations are searched, the autonomous driving vehicle 840 outputs the candidate destinations (S1950). For example, the candidate destinations can be output from an output unit of the autonomous driving vehicle 840 or the output terminal of the passenger terminal 810. For example, a map can be displayed and graphic objects indicating the candidate destinations can be displayed on the map.

The passenger can select any one of the candidate destinations using a touch or a voice. In this instance, the autonomous driving vehicle 840 starts to perform autonomous driving to the candidate destination selected by the passenger (S1970). Also, the autonomous driving vehicle 840 outputs destination change information (S1990). Accordingly, the passenger can simply select a point at which he is to get out.

If any one candidate destination is not selected within a predetermined time from the point at which the candidate destinations are output, the autonomous driving vehicle 840 can select any one candidate destination closest thereto (i.e., to which a movement distance is shortest).

Figure 20:
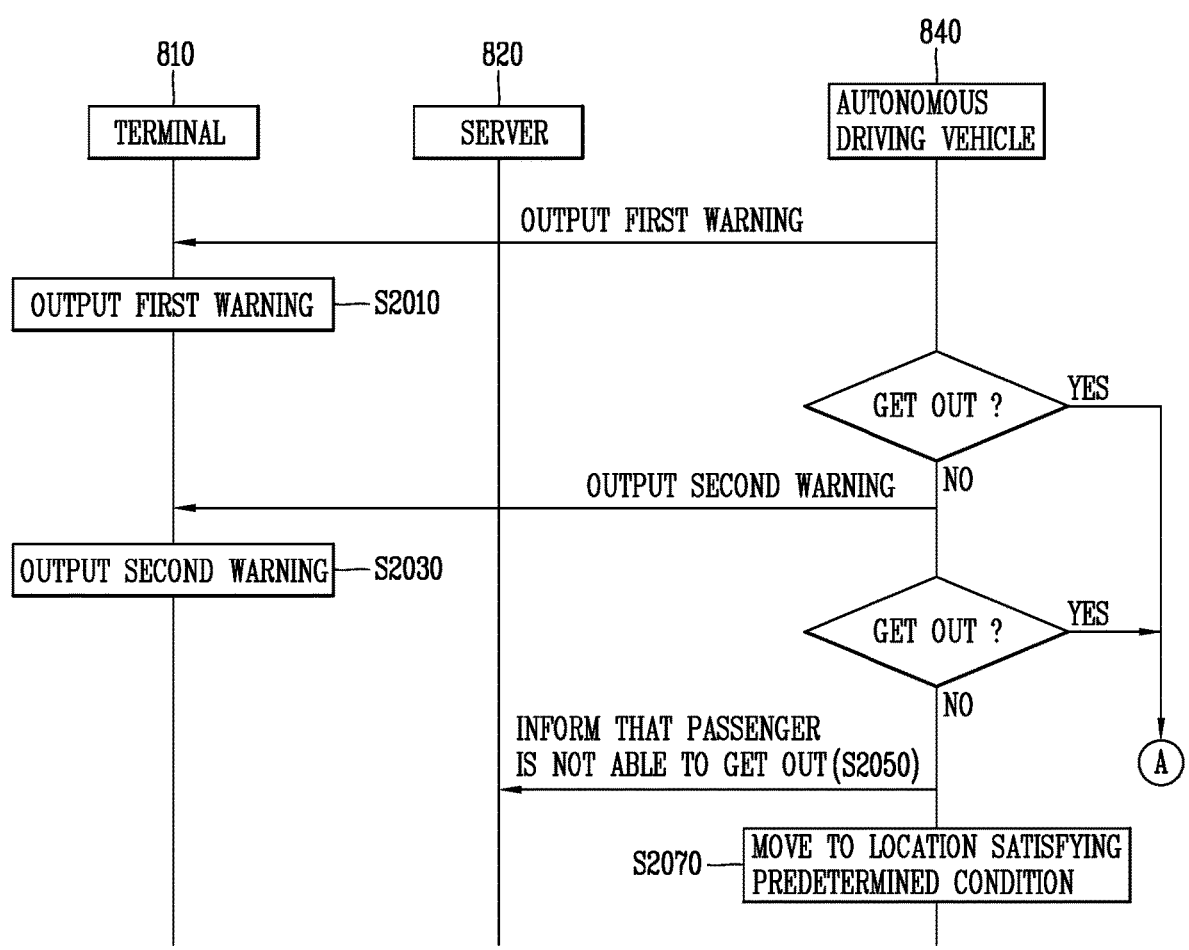
FIG. 20 is a flow chart illustrating an example of an operation of an autonomous driving vehicle in a scenario in which an autonomous driving vehicle approaches or arrives at a destination.

An operation related to passenger's getting off after the autonomous driving vehicle 840 parks in the destination will be described in detail with reference to FIG. 20. In particular, FIG. 20 is a flow chart illustrating an example of operating an autonomous driving vehicle when an autonomous driving vehicle approaches or arrives at a destination.

Based on an arrival time to the second destination, the autonomous driving vehicle 840 can output first warning guiding the passenger to get out. For example, if it's one minute to get the second destination, or when the autonomous driving vehicle 840 arrives at the second destination, in one minute after the autonomous driving vehicle 840 is completely parked in the second destination, the autonomous driving vehicle 840 can output a first warning.

The first warning can be output to the output unit of the autonomous driving vehicle 840 and/or the output unit of the passenger terminal 180 in at least one of visual, tactile, and audile manners (S2010). In some scenarios, the autonomous driving vehicle 840 can determine whether the passenger gets out. For example, the autonomous driving vehicle 840 can determine whether a passenger still remains within the vehicle, without getting off, using an image captured by the internal camera or a thermal sensor, and the like.

After outputting the first warning, if the passenger does not get out even after the lapse of a predetermined time, the autonomous driving vehicle 840 and/or the passenger terminal 810 can output a second warning (S2030). The second warning can be output with a strength stronger than that of the first warning. For example, when the first warning was output with a first volume level, the second warning can be output with a second volume level stronger than that of the first volume level. When a warning is output in a tactile manner, the second warning can be output with a stronger level.

Further, the passenger may not be able to get out, for example if the passenger is asleep or otherwise incapacitated. In such scenarios, at the time of the second warning, the second warning can be output with a degree that is greater than a threshold, for example to wake the passenger. After the second warning is output, if the passenger does not get out even after the lapse of a predetermined time, the autonomous driving vehicle 840 may, for example, determine that the passenger's situation is abnormal, and inform the server 820 that the passenger cannot get out (S2050).

In addition, after the autonomous driving vehicle 840 is parked in the second destination, if the passenger does not get out even after the lapse of a predetermined time, the autonomous driving vehicle 840 can perform autonomous driving to a location satisfying a predetermined condition (S2070). The location satisfying the predetermined condition may be, for example, a closest police station or a management office managing the autonomous driving taxi service.

The system may implement, in some scenarios, a manager for managing the autonomous driving taxi service. For example, a single manager may manage several autonomous driving vehicles. When the manager is informed by the autonomous driving vehicle 840 that the passenger cannot get out, the manager can check a state of the passenger using the internal camera of the vehicle.

For example, when the passenger is asleep or otherwise incapacitated, the manager can attempt to make a call to an emergency contact number of the passenger or can transmit a command for moving to the police station to the autonomous driving vehicle 840. In some scenarios, the autonomous vehicle 840 can send a notification that a passenger cannot get out even though the vehicle 840 does not have a passenger, for example when is no passenger but it is determined that there is a passenger. In such scenarios, the autonomous driving vehicle 840 may be initialized.

Figure 21:
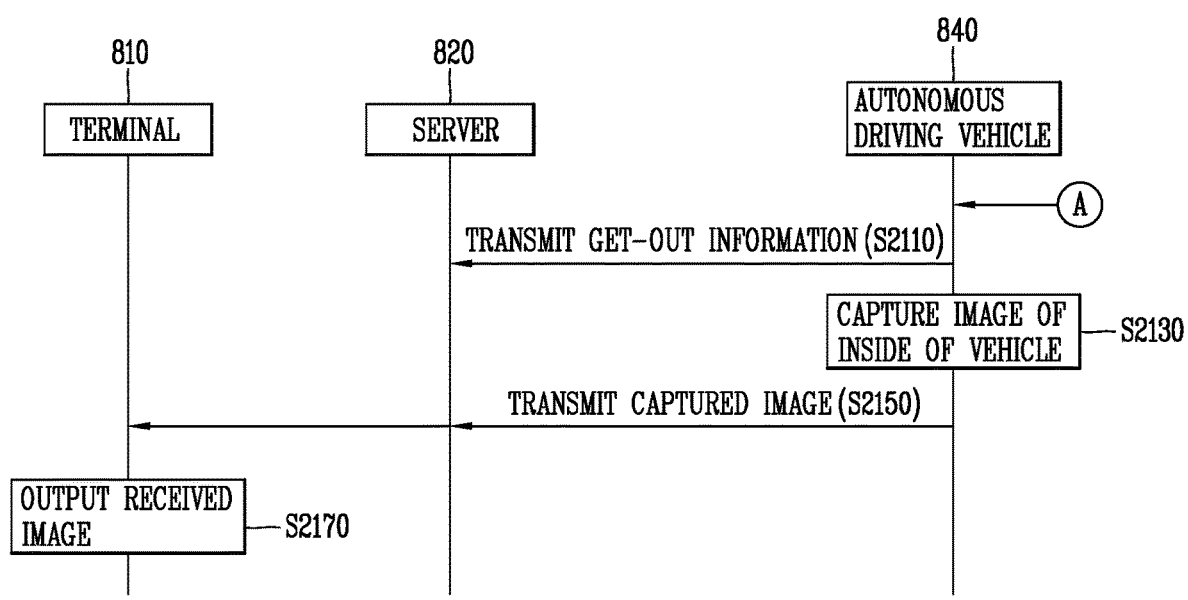
FIG. 21 is a flow chart illustrating an example of an operation of an autonomous driving system when a passenger exits.

Next, FIG. 21 is a flow chart illustrating an example of operating an autonomous driving system when a passenger gets out. When all the passengers get out, the autonomous driving vehicle 840 can control the wireless communication unit to transmit get-out information to the server 820 (S2110). In this instance, the autonomous driving vehicle 840 is switched to a standby state in which the autonomous driving vehicle 840 can take on a new passenger in a service providing state. In addition, the autonomous driving vehicle 840 switched to the standby state can remain in the parked state in the second destination or can start autonomous driving to an area to take on a passenger.

The autonomous driving vehicle 840 further includes an internal camera for imaging the inside of the autonomous driving vehicle 840, and when all the passengers get out, the autonomous driving vehicle 840 can control the internal camera to capture an image (S2130). Also, the autonomous driving vehicle 840 can control the wireless communication unit to transmit the captured image to the passenger terminal 810 or the server 820 (S2150). The passenger terminal 810 can then display the received image (S2170).

As an example, if the passenger is the driver, then the autonomous driving vehicle 840 can check whether the passenger has left things behind or has damaged the vehicle. This checking may be performed, for example, in real time or with a delay sufficiently small enough to provide such information shortly after the driver exits the vehicle 840. For example, the autonomous driving vehicle 840 can sense things that are left in the vehicle by using an image captured by the internal camera, or can sense damage to the vehicle 840 by using one or more sensors, such as a camera. As such, the system can enable a passenger to check whether things were left behind through an image displayed on the passenger terminal 810 and also check damage to the vehicle 840, or the like.

Figure 22:
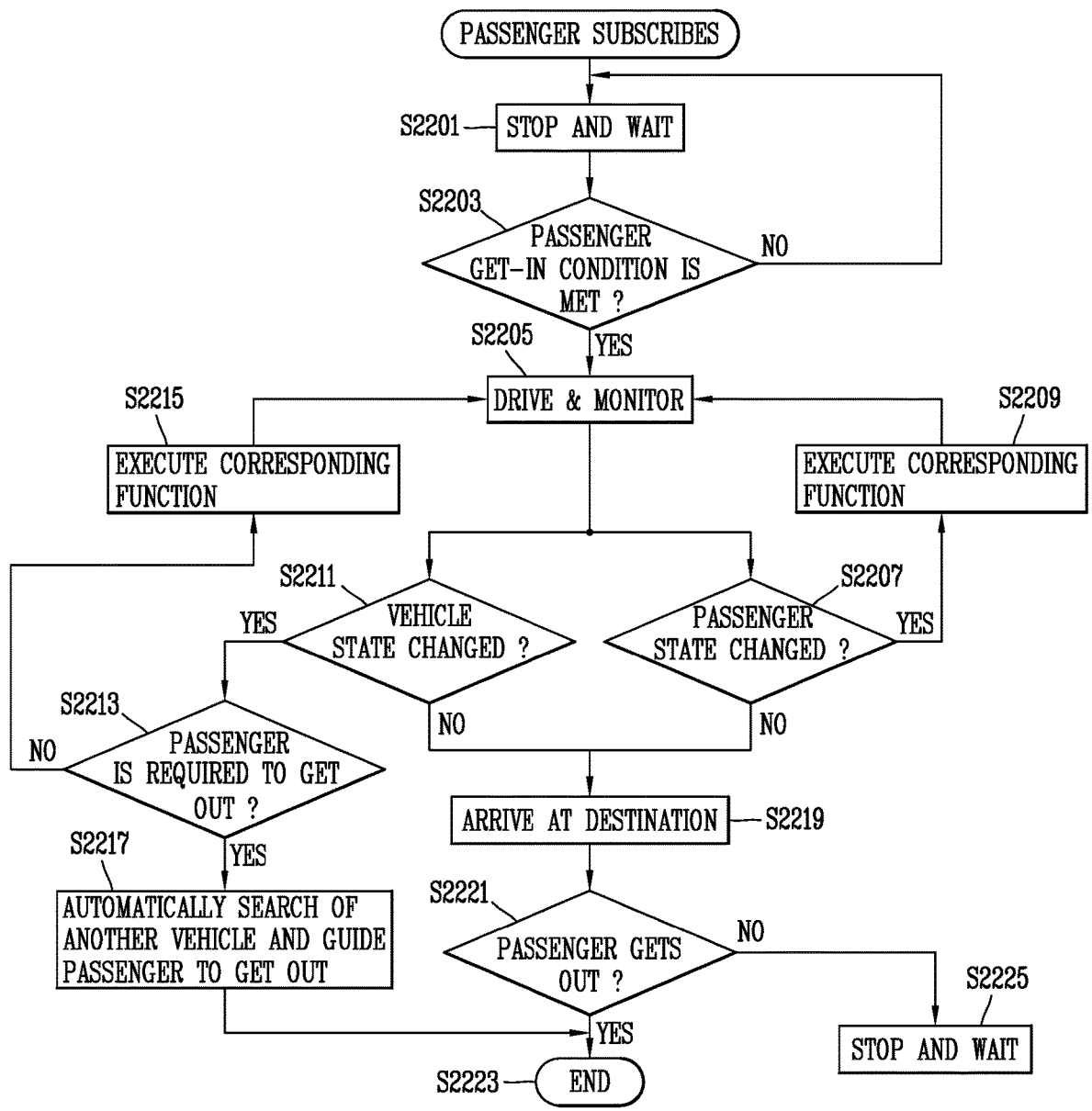
FIG. 22 is a flow chart illustrating an example of an operation of an autonomous driving vehicle according to an implementation of the present disclosure.

Next, FIG. 22 is a flow chart illustrating an example of an operation of an autonomous driving vehicle according to an embodiment of the present disclosure. In response to a reservation made by a passenger, the autonomous driving vehicle 840 performs autonomous driving to the first destination, and stops and waits (S2201).

The autonomous driving vehicle 840 can remain to be stopped until a passenger get-in condition (or an autonomous driving condition) is met (S2203). When the autonomous driving condition is met, the autonomous driving vehicle 840 starts autonomous driving to the second destination and monitors a vehicle state and the passenger (S2205).

If a vehicle state is changed or if a state of the passenger is changed, then a function corresponding to a generated event is executed. For example, if a state of the passenger changes (S2207), then the autonomous driving vehicle 840 can execute one or more functions based on the changed state of the passenger (S2209). As a particular example, if the passenger has difficulty breathing, then the autonomous driving vehicle 840 can open a window such that external air is supplied to the inside of the vehicle 840. After generating, the function, the vehicle 840 can continue monitoring (S2205).

As another example, if a state of the vehicle 840 changes (S2211), then the vehicle 840 can determine whether the passenger is required to get out (S2213). When a vehicle state does not require the passenger to get out, the autonomous driving vehicle 840 can execute a function corresponding to a generated event (S2215). For example, when the autonomous driving vehicle 840 is required to be refueled, the autonomous driving vehicle 840 can set a gas station as a stop, and after refueling is completed, the autonomous driving vehicle 840 can perform autonomous driving to the second destination. After executing the function, the vehicle 840 may continue monitoring (S2205).

When a vehicle state requires the passenger to get out, in some embodiments the autonomous driving vehicle 840 automatically searches for a vehicle to assist movement of the autonomous driving vehicle 840 to the second destination, and guide the passenger to get out (S2217). When the autonomous driving vehicle 840 arrives at the destination, such as the second destination (S2219), then in some embodiments the autonomous driving vehicle 840 determines whether the passenger gets out (S2221).

When the passenger gets out, providing the autonomous driving taxi service is completed and the autonomous driving vehicle 840 waits for a next reservation (S2223). When the passenger does not get out in the second destination, the autonomous driving vehicle 840 is stopped until the passenger gets out, and waits (S2225).

If the passenger does not get out even after the lapse of a predetermined time from a point in time at which the autonomous driving vehicle 840 arrived at the second destination, then the autonomous driving vehicle 840 can move to a location satisfying a predetermined condition such as a police station, or the like. The autonomous driving vehicle 840 can additionally or alternatively inform the server 820 about a get-out unavailability, and the manager of the autonomous driving vehicle 840 can attempt at making a call to an emergency contact number of the passenger.

When starting driving, the autonomous driving vehicle 840 can lock the door, for example, to prevent the door from abruptly being opened. When the door is unlocked or opened while the autonomous driving vehicle 840 is driving, it may be considered that the passenger has an intention to get out. Thus, when the door is unlocked or opened, the controller 170 can control the autonomous driving vehicle 840 to be stopped and turn on an emergency lamp. Thereafter, when it is determined that the passenger has completely gotten out, the autonomous driving vehicle 840 can turn off the emergency lamp.

The door may be unlocked even when the autonomous driving vehicle 840 is moving. However, for the purpose of passenger safety, the door can be configured not to be opened while the autonomous driving vehicle 840 is moving. For example, the door can be configured to be opened only when the autonomous driving vehicle 840 is stopped.

Also, the system can determine not to unlock the door based on a condition of a passenger, such as the age of a passenger. As an example, the autonomous driving vehicle 840 can determine whether a passenger satisfies a predetermined condition using a sensor such as the camera, or the like, and when the passenger satisfies the predetermined condition, the autonomous driving vehicle 840 can control the door not to be unlocked until the autonomous driving vehicle 840 arrives at the second destination. For example, when a preschooler is present in the passenger's seat, unlocking a door corresponding to the passenger's seat may be limited until the autonomous driving vehicle 840 reaches the second destination.

The passenger can select a point at which he is to get out by simply unlocking the door or opening the door, even without a separate input. For example, the passenger can get out from a point, rather than at the second destination, while autonomous driving toward the second destination is performed.

In this instance, the autonomous driving vehicle 840 controls the wireless communication unit to transmit the get-out point to the passenger terminal 810 and/or the server 820. A use fare of the autonomous driving vehicle 840 is calculated based on the get-out point, and the autonomous driving vehicle 840 is switched to a standby state in which the autonomous driving vehicle 840 is newly reserved at the get-out point.

The passenger can temporarily get out at a desired point, rather than a final destination, and after finishing his business, the passenger can get in the autonomous driving vehicle 840 again and move to the final destination. That is, when the passenger gets out at a point, not the second destination, the get-out point may be a stop.

When the passenger gets out at the stop, the autonomous driving vehicle 840 can perform autonomous driving to park in a parking available point in which the autonomous driving vehicle 840 is parked for a predetermined period of time until the passenger gets in again. The parking available point may be a get-out point of the passenger, and may be a parking lot, or the like, located within a predetermined area with respect to the get-out point.

The parking available point is transmitted to the passenger terminal 810 and/or the server 820. The passenger can check the parking available point displayed on the passenger terminal 810 and may get in the autonomous driving vehicle 840 again at the parking available point.

The autonomous driving vehicle 840 can determine whether the get-out point of the passenger is a "final get-out point" or a "stop"." Thus, when the passenger gets out at a point, rather than the second destination, the autonomous driving vehicle 840 transmits the get-out point to the server 820 and/or the passenger terminal 810.

When a standby command is received from the server 820 and/or the passenger terminal 810 within a predetermined time from a point at which the get-out point was transmitted, the autonomous driving vehicle 840 performs autonomous driving to the parking available point. That is, when the standby command is received, the get-out point is a stop.

If, however, when a standby command is not received within the predetermined time or when a service termination is received from the server 820 and/or the passenger terminal 810, the autonomous driving vehicle 840 is switched to a standby state for receiving a new reservation. In this instance, the get-out point is a final get-out point.

When the get-out point is a stop, calculation of the use fare is continuously performed, without being stopped, and when the get-out point is a final destination, calculation of the use fare is terminated based on a point in time at which the passenger gets out. In some implementations, a plurality of service users can be provided with a single autonomous driving taxi service.

For example, a list of reserved passengers may include a first passenger holding a first terminal and a second passenger holding a second terminal. During a reservation process, the first passenger can include the second passenger, i.e., the second terminal, as a fellow passenger, while generating a reservation request using the first terminal. In this instance, the first and second passengers may get in the autonomous driving vehicle 840 at the same point or at different points.

When the first and second passengers are located at different points, the autonomous driving vehicle 840 can perform autonomous driving to a first destination based on a location of any one of the first terminal and the second terminal, and subsequently perform autonomous driving to a first stop based on a location of the other.

The autonomous driving vehicle 840 or the server can select any one passenger to get in earliest among the first and second passenger based on a location thereof, and sets a first destination, i.e., a departure point, at which the selected passenger is to get in. Also, the autonomous driving vehicle 840 sets a stop at which the other passenger is to get in.

The autonomous driving vehicle 840 remains in a stopped state until the first passenger gets in at the first destination, and when an autonomous driving condition to be fulfilled by the first passenger is met, the autonomous driving vehicle 840 starts autonomous driving to the first stop. Thereafter, the autonomous driving vehicle 840 remains in the stopped state until the second passenger gets in at the stop, and when both the autonomous driving condition to be fulfilled by the first passenger and the autonomous driving condition to be fulfilled by the second passenger are met, the autonomous driving vehicle 840 starts autonomous driving toward the second destination.

However, when the second passenger does not get in within a predetermined time from a point at which the autonomous driving vehicle 840 arrived at the stop, the autonomous driving vehicle 840 determines that the second passenger's getting in the vehicle has canceled, and when the autonomous driving condition to be fulfilled by the first passenger is met, the autonomous driving vehicle 840 can start autonomous driving to the second destination.

Since estimated times of arrival of the autonomous driving vehicle regarding the first destination, the stop, and each point are illustrated in the first and second terminals, a plurality of passengers can conveniently use the autonomous driving taxi service at different points through a single reservation.

The plurality of passengers may get in at the same point and get out at different points. For example, when the first passenger holding the first terminal and the second passenger holding the second terminal get in at the first destination and both the first and second passengers satisfy the autonomous driving conditions, the autonomous driving vehicle 840 can start autonomous driving to the second destination. If, however, at least one of the first and second passengers does not satisfy the autonomous driving conditions, the stopped state is maintained.

When any one of the first and second passengers gets out while the autonomous driving vehicle 840 is performing autonomous driving toward the second destination, the controller 170 can control the autonomous driving vehicle 840 to be stopped, and when the other passenger satisfies the autonomous driving conditions, the autonomous driving vehicle 840 can resume autonomous driving toward the second destination.

For example, when the first passenger gets out, a user interface asking whether the passenger has an intention to get in again can be output on the first terminal. When an intention to get in again is received from the first passenger within a predetermined time, a standby command is generated. That is, a standby command is generated by the first terminal and transmitted to the server 820 and/or the autonomous driving vehicle 840. When a standby command is received from a terminal of a passenger who has gotten out, the autonomous driving vehicle 840 can perform autonomous driving to stop at a stop available point until the passenger who has gotten out to get in again.

Since the passenger, who has gotten out, has an intention to get in again, the autonomous driving vehicle 840 can output guide information guiding that the passenger who has gotten out is to get in again to the output unit of the autonomous driving vehicle 840. The guide information can be output on a terminal of another passenger who is present in the autonomous driving vehicle 840.

The autonomous driving vehicle 840 can output a location of the first terminal and a time remaining until the first terminal is to get in again, as guide information. Conversely, when an intention to get out is received from the first passenger within the predetermined time or when a predetermined time has lapsed without checking an intention of the first passenger, the autonomous driving vehicle 840 is switched to a state in which the first passenger has completely gotten out. In this instance, the autonomous driving vehicle 840 can output guide information indicating that the first passenger has completely gotten out. Since a destination of the first passenger is excluded, a route scheduled to drive is also changed.

When a first passenger destination regarding the first passenger and a second passenger destination regarding the second passenger have been individually set, the destination of the passenger who has gotten out is excluded from the route. For example, when the first passenger has completely gotten out, the first passenger destination is excluded from the route and a second destination is set as the second passenger destination.

Thereafter, according to whether the second passenger satisfies autonomous driving conditions, autonomous driving toward the second destination may be resumed or the autonomous driving vehicle 840 can remain in the stopped state. In determining autonomous driving conditions to resume autonomous driving to the second destination, the autonomous driving vehicle 840 may exclude the first passenger.

The autonomous driving conditions to determine whether to resume autonomous driving to the second destination for the second passenger can include, for example, the second passenger's autonomous driving condition. Additionally or alternatively, the autonomous driving conditions to resume autonomous driving to the second destination may include other conditions, such as whether the second passenger has given permission to resume autonomous driving to the second destination without the first passenger.

Implementations of the present disclosure may be implemented as a computer-readable code (or an application or software) in a medium in which a program is recorded. The method for controlling an autonomous driving vehicle may be realized by a code stored in a memory, or the like.

The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

The foregoing implementations and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be embodied in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An autonomous driving vehicle comprising:
   a wireless communication unit configured to receive a location of an external terminal having requested the autonomous driving vehicle; and
   a processor configured to:
   perform autonomous driving of the autonomous driving vehicle to a first destination corresponding to the location of the external terminal;
   detect a person at the first destination getting into the autonomous driving vehicle;
   in response to the detected person getting into the autonomous driving vehicle satisfying an autonomous driving condition, perform the autonomous driving to a second destination requested by the external terminal; and in response to the detected person getting into the autonomous driving vehicle not satisfying the autonomous driving condition, maintain a stopped state of the autonomous driving vehicle at the first destination, wherein the processor is further configured to determine whether the autonomous driving condition is satisfied by:

determining a subscriber who has reserved the autonomous driving to the second destination; and determining whether the subscriber who has reserved the autonomous driving to the second destination matches the detected person getting into the autonomous driving vehicle, and wherein the processor is further configured to perform the autonomous driving based on determining that the subscriber who has reserved autonomous driving to the second destination matches the person at the first destination by:

selecting at least one door of the autonomous driving vehicle based on the location of the terminal; and unlocking the selected at least one door.

2. The autonomous driving vehicle of claim 1, wherein the autonomous driving condition comprises the detected person wearing a seat belt.

3. The autonomous driving vehicle of claim 2, wherein the autonomous driving condition comprises the detected person in a driver's seat of the autonomous driving vehicle satisfying a driving permission condition.

4. The autonomous driving vehicle of claim 1, wherein the processor is further configured to determine whether the subscriber matches the detected person getting into the autonomous driving vehicle by:

determining first information related to the subscriber;

determining second information related to detected person getting into the autonomous driving vehicle; and determining whether the first information is consistent with the second information.

5. The autonomous driving vehicle of claim 4, wherein each of the first information and the second information comprises at least one of an image of a person, a passcode, a fingerprint, iris information, or NFC tag information.

6. The autonomous driving vehicle of claim 1, further comprising:

an external camera configured to obtain an image an outside of the autonomous driving vehicle, wherein the processor is further configured to:

capture, via the external camera, at least one image of the outside of the autonomous driving vehicle when the vehicle is within a threshold range of the first destination; and perform autonomous driving in a direction towards the terminal when the person is present in the at least one image.

7. The autonomous driving vehicle of claim 1, wherein the processor is further configured to:

output notification information indicating that performing the autonomous driving to the second destination does not start until the autonomous driving condition is met, when the autonomous driving condition is not satisfied.

8. The autonomous driving vehicle of claim 7, wherein the notification information comprises guidelines to be followed in order to start the performing of the autonomous driving to the second destination.

9. The autonomous driving vehicle of claim 8, wherein the processor is further configured to:

output notification information comprising information regarding the person and guidelines to be followed by the person when the person does not satisfy the autonomous driving condition.

10. The autonomous driving vehicle of claim 7, wherein the processor is further configured to:

output the notification information through at least one of an output unit in the autonomous driving vehicle or an output unit provided in the terminal of the user.

11. The autonomous driving vehicle of claim 1, wherein the processor is further configured to:

based on the autonomous driving vehicle being in a transfer state, stop the autonomous driving vehicle and output transfer information regarding providing transportation to the second destination.

12. The autonomous driving vehicle of claim 11, wherein the transfer information comprises at least one of information regarding a second vehicle assisting the autonomous driving vehicle in providing transportation to the second destination, a location of the second vehicle, or a time required for the second vehicle to reach a location of the autonomous driving vehicle.

13. The autonomous driving vehicle of claim 11, wherein the processor is further configured to:

stop an accumulation of a passenger fare of the autonomous driving vehicle when the autonomous driving vehicle is the transfer state.

14. The autonomous driving vehicle of claim 1, wherein the processor is further configured to:

output a first warning based on an expected time of arrival at the second destination.

15. The autonomous driving vehicle of claim 14, wherein the processor is further configured to:

when the person has not exited the autonomous driving vehicle after a threshold period of time, output a second warning having an output strength greater than an output strength of the first warning.

16. The autonomous driving vehicle of claim 14, wherein the processor is further configured to:

when the person has not exited after the threshold period of time since a time at which the autonomous driving vehicle stopped at the second destination, start autonomous driving the vehicle to a third destination.

17. The autonomous driving vehicle of claim 14, wherein the processor is further configured to, based on the autonomous driving vehicle not being able to stop at the second destination:

search for a third destination;

start autonomous driving to the third destination; and output destination change information regarding the third destination.

18. The autonomous driving vehicle of claim 1, further comprising:

an internal camera configured to capture an image of an inside of the autonomous driving vehicle, wherein the processor is further configured to:

when the person has exited the autonomous driving vehicle, control the wireless communication unit to transmit the captured image to at least one of the terminal or a server.

19. The autonomous driving vehicle of claim 1, wherein the processor is further configured to:

when the person has exited the autonomous driving vehicle, control the wireless communication unit to transmit, to a server, information indicating that the person has exited the autonomous driving vehicle.

20. The autonomous driving vehicle of claim 1, wherein the processor is further configured to:
  determine a use fare of the autonomous driving vehicle based on a time at which autonomous driving to the second destination has begun after performing the autonomous driving to the first destination.

21. The autonomous driving vehicle of claim 1, wherein the processor is further configured to, based on a determination that a first passenger holding a first terminal and a second passenger holding a second terminal are included in a list of reserved passengers:
  perform autonomous driving to the first destination based on a first location of the first terminal; and
  subsequently perform autonomous driving to a stop location based on a second location of the second terminal.

22. The autonomous driving vehicle of claim 21, wherein the processor is further configured to:
  maintain a stopped state at the first location until the first passenger enters the autonomous driving vehicle; and
  based on the first passenger satisfying at least one first autonomous driving condition to be fulfilled by the first passenger, start autonomous driving to the stop location for the second passenger.

23. The autonomous driving vehicle of claim 22, wherein the processor is further configured to:
  maintain a stopped state at the stop location until the second passenger enters the autonomous driving vehicle; and
  based on both the first passenger and the second passenger satisfying their respective at least one autonomous driving condition, start autonomous driving to the second destination.

24. The autonomous driving vehicle of claim 1, wherein the processor is further configured to, based a first passenger holding a first terminal and a second passenger holding a second terminal both entering the autonomous driving vehicle at the first destination:
  based on the first passenger satisfying at least one first autonomous driving condition and the second passenger satisfying at least one second autonomous driving condition, start autonomous driving to the second destination; and
  based on at least one of the first or second passenger not satisfying the respective at least one first or second autonomous driving condition, maintain the stopped state at the first destination.

25. The autonomous driving vehicle of claim 24, wherein the processor is further configured to, based on the first passenger exiting during autonomous driving to the second destination:
  stop the autonomous driving vehicle;
  based on the second passenger satisfying a third autonomous driving condition, resume autonomous driving to the second destination.

26. The autonomous driving vehicle of claim 25, wherein the third autonomous driving condition comprises at least one of:
  the second autonomous driving condition, or
  whether the second passenger has given permission to resume autonomous driving to the second destination without the first passenger.

27. The autonomous driving vehicle of claim 25, wherein the processor is further configured to, based on the first passenger exiting the autonomous driving vehicle during autonomous driving to the second destination:
  receive information from a terminal of the first passenger who exited; and
  output guidance information based on the information received from the terminal of the first passenger.

28. The autonomous driving vehicle of claim 1, wherein the processor is further configured to:
  based on the person exiting at an exit location, other than the second destination, during the autonomous driving to the second destination, control the wireless communication unit to transmit, to the terminal of the person or to a server, an indication of the person exiting.

29. The autonomous driving vehicle of claim 28, wherein the processor is further configured to:
  receive, from the terminal of the person who exited and after transmitting the indication of the person exiting the autonomous driving vehicle, a standby command indicating that the person will be returning,
  based on receiving the standby command indicating that the user will be returning, perform autonomous driving to an available parking location, and
  control the wireless communication unit to transmit, to the terminal of the person or to the server, information regarding the available parking location.

30. The autonomous driving vehicle of claim 1, wherein the processor is further configured to determine that the person at the first destination has entered the autonomous driving vehicle by at least one of:
  detecting that the terminal enters vehicle,
  detecting that at least one seat is occupied,
  detecting an image of the person in the autonomous driving vehicle, or
  detecting the person has input a confirmation of entering the autonomous driving vehicle.

* * * * *